United States Patent
Tamura

(10) Patent No.: US 8,520,260 B2
(45) Date of Patent: Aug. 27, 2013

(54) IMAGE FORMING APPARATUS AND IMAGE FORMING METHOD FOR CORRECTING REGISTRATION DEVIATION

(75) Inventor: Hirokazu Tamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 12/938,169

(22) Filed: Nov. 2, 2010

(65) Prior Publication Data

US 2011/0116136 A1    May 19, 2011

(30) Foreign Application Priority Data

Nov. 13, 2009  (JP) ................... 2009-260320

(51) Int. Cl.
*H04N 1/405* (2006.01)
*H04N 1/60* (2006.01)

(52) U.S. Cl.
USPC .......................................... 358/3.06; 358/1.9

(58) Field of Classification Search
USPC .............. 358/3.06, 1.9, 3.13, 3.14, 3.26, 448, 358/451, 2.1, 3.03, 3.04, 3.05, 1.16, 3.23, 358/3.24, 3.21, 521, 524, 534, 444; 382/274, 382/275, 252; 347/12, 14, 15, 23, 9
See application file for complete search history.

(56) References Cited

U.S. PATENT DOCUMENTS

| | | | | |
|---|---|---|---|---|
| 5,243,440 | A * | 9/1993 | Hashimoto | 358/448 |
| 7,570,392 | B2 * | 8/2009 | Takahashi | 358/3.03 |
| 7,684,079 | B2 * | 3/2010 | Takata et al. | 358/1.9 |
| 8,243,333 | B2 * | 8/2012 | Tamura | 358/2.1 |
| 8,274,699 | B2 * | 9/2012 | Hirose et al. | 358/1.9 |
| 2009/0161124 | A1 | 6/2009 | Tamura | 358/1.1 |

FOREIGN PATENT DOCUMENTS

| | | |
|---|---|---|
| JP | 2001-309139 | 11/2001 |
| JP | 2004-170755 | 6/2004 |

* cited by examiner

*Primary Examiner* — Charlotte M Baker
(74) *Attorney, Agent, or Firm* — Fitzpatrick, Cella, Harper & Scinto

(57) ABSTRACT

There exists a problem that, for registration correction, carrying out less-than-one-pixel-basis correction and one-pixel-basis correction for an image after half toning using screen processing causes unevenness in density when it is hard for linearity of image density against a PWM to come out. Processing of interpolation is carried out so that the way how a halfdot is formed may always becomes the same after the interpolation processing. By applying a matrix in consideration of a dot direction which may be broken by the interpolation processing at the time of the screen processing, conversion in which a way of locating the half dot maintains relation of vertical inversion in a subscanning direction is carried out, and less-than-one-pixel-basis correction is carried out.

9 Claims, 23 Drawing Sheets

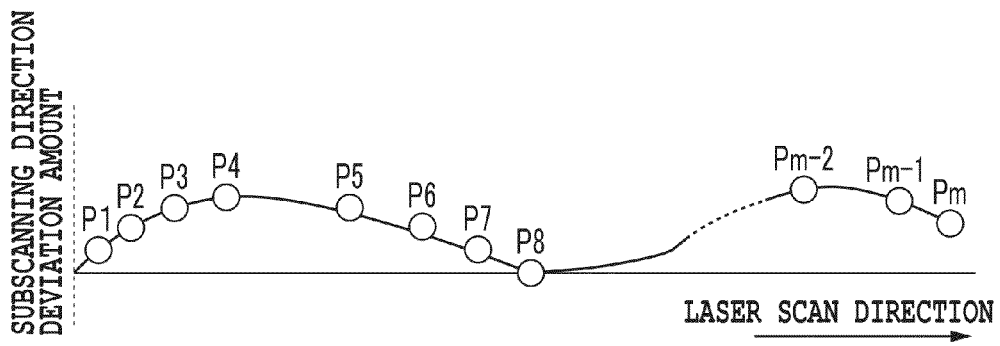
FIG.5A
| CHANGING POINT | P1 | P2 | P3 | P4 | P5 | P6 | P7 | P8 | ......... | Pm-2 | Pm-1 | Pm |
|---|---|---|---|---|---|---|---|---|---|---|---|---|
| DIRECTION | ↑ | ↑ | ↑ | ↓ | ↓ | ↓ | ↓ | ↑ | ......... | ↓ | ↓ | - |
FIG.5B
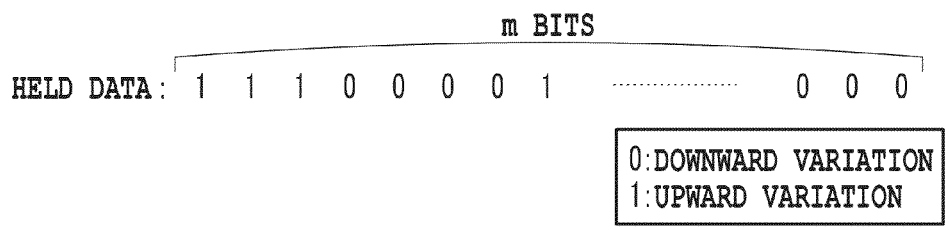
FIG.5C

FIG.14

(a) INCLINATION DEVIATION AMOUNT 
(b) BITMAP IMAGE (BEFORE CORRECTION) 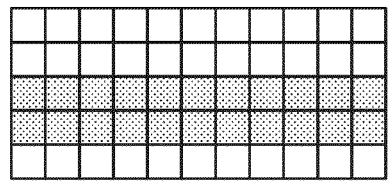
(c) CORRECTED BITMAP IMAGE 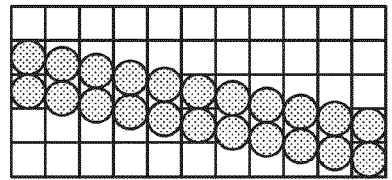
(d) BITMAP IMAGE (AFTER CORRECTION) 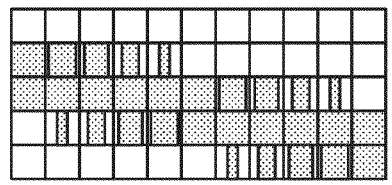
(e) EXPOSURE IMAGE 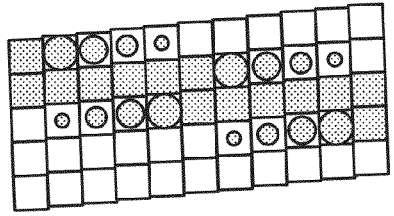
FIG.23

IMAGE FORMING APPARATUS AND IMAGE FORMING METHOD FOR CORRECTING REGISTRATION DEVIATION

BACKGROUND OF THE INVENTION

1. Field of the Invention

The present invention relates to an image forming apparatus for correcting registration deviation.

2. Description of the Related Art

An electrophotography is known as an image recording system used in a color image forming apparatus such as a color printer or a color copying machine. The electrophotography is one which forms a latent image on a photoconductive drum by utilizing a laser beam, and develops it with a charged color material (hereinafter referred to as toner). Recording of an image is carried out by transferring and fixing the image developed using the toner onto a transfer paper.

Recent years, because of image formation speed-up of the electrophotographic color image forming apparatus, increasing are tandem type color image forming apparatuses having the same number of developing machines and photoconductive drums as a number of toner colors, and transferring images of different colors one after another on an image transfer belt, and on a recording medium. In this tandem type color image forming apparatus, it is known that a plurality of factors causing the registration deviation exist, and various solutions are proposed for each of the factors.

One of the factors is nonuniformity or fixing-position deviation of lens of a deflection scanner, and attaching-position deviation of the deflection scanner against the main body of the color image forming apparatus. Because of this position deviation, an inclination and a curvature arise in the scanning line, and a degree of the curvature (hereinafter referred to as a profile) becomes different for every color, which leads to the registration deviation. The profile differs in characteristic thereof in each image forming apparatus, that is, in every recording engine, furthermore in each color.

As a countermeasure method for this registration deviation, there exists a method of measuring magnitude of the inclination and the curvature of the scanning line by using an optical sensor, correcting bitmap image data so that they may be canceled, and forming the corrected image (for example, refer to Japanese Patent Laid-Open No. 2004-170755). In this method, since the correction is carried out electrically by processing the image data, a mechanical adjustment member and an adjustment process at the time of assembly becomes unnecessary. Therefore, it becomes possible to miniaturize magnitude of the color image forming apparatus, and the registration deviation can be coped with at low cost. This electric registration deviation correction is divided into one-pixel-basis correction and less-than-one-pixel-basis-basis correction. The one-pixel-basis correction makes the pixel offset in a subscanning direction by one-pixel-basis depending on the correction amount of the inclination and curvature. In the case of using this method, in the image forming apparatus in which the curvature and inclination are about several 100 to 500 micrometers, and the resolution is 600 dpi, an image memory for several ten lines is needed in order to carryout the correction. In the following descriptions, a position made to be offset is referred to as a change point.

The less-than-one-pixel-basis correction adjusts a tone value of image data by before and after pixels in the subscanning direction, as illustrated in FIG. 23. That is, when it has bent upward by the profile, the image data before correction is corrected to a reverse direction in the subscanning side against the direction which the profile indicates. With such a method, by carrying out the less-than-one-pixel-basis correction, an unnatural level difference at the change point boundary line arisen by the one-pixel-basis correction can be dissolved, and smoothing of the image can be attained.

In the case of carrying out the smoothing processing for the image having progressed to a screen processing immediately before printing, the smoothing is carried out by carrying out pulse width modulation (PWM: Pulse Width Modulation) for the laser beam and switching the laser exposure time gradually in the subscanning direction. For example, in the case of a 0.5-pixel less-than-one-pixel-basis correction, a half exposure will be carried out twice vertically in the subscanning direction. Such interpolation processing is materialized for the first time in the relation that an image density is linear against the exposure time of the PWM, and there are many cases where the same density as one of the exposure for one pixel can not reproduced by two of the exposures for 0.5 pixels even under any kinds of conditions. There also exists one which, also against such problems, in addition to interpolating calculation, devises the way to make lighting-up of the PWM get up right and left, etc., and makes an image centroid shift, and carries out registration correction. (Japanese Patent Laid-Open No. 2001-309139) However, when the linearity of the density against the PWM cannot be held, the image data where it is more preferable to carry out the above-mentioned interpolation processing and the image data where image quality thereof will be impaired if the correction is carried out will exist mixedly.

For example, as for a repeated pattern of the same pattern or a design (hereinafter, referred to as pattern image), and as for a character and a thin line or the like which are able to be rendered with office document creation software, visibility of information thereof is enhanced by carrying out the interpolation processing and smoothing. On the contrary, when the interpolation processing is carried out in the change point of a continuous tone image for which the screen processing has been carried out, there exists a problem that unevenness in density arises only on the change point, and the image quality degrades. As the reason, for example in the case of a line growth screen being used, since a thickness of a line which composes the screen will have changed on the change point due to the interpolation processing, macroscopically it seems that the density has changed. When the interpolation processing is carried out against add-on images such as tint blocks, the effect may be impaired, and therefore, the interpolation processing is not suitable.

As described above, in a situation where it is hard to make linearity of the density against the PWM pulse width come out, it is not appropriate to carry out the interpolation processing for any kinds of images, and a certain decision processing has become needed. However, even in the case of carrying out the decision processing, an erroneous decision may arise, and in the case of carrying out high-speed decision processing, there exist problems in which a circuit becomes complicated or the like. As a result of the decision processing, when the interpolation processing is not carried out for the continuous tone image for which the screen processing has been carried out, the level difference of one pixel which occurs at the change point will be allowed, and the level difference also becomes recognized visually as the degradation depending on a type of the image.

Then, for the image for which the screen processing has been carried out, the correction processing which does not make unevenness in density or the level difference of one pixel which may occur on the change point arise even in a situation where it is hard to make the linearity come out easily, has been required.

SUMMARY OF THE INVENTION

An image forming apparatus of the present invention comprises an interpolation processing component configured to carry out less-than-one-pixel-basis correction of image data by correcting density of each pixel of the image data so that sequence of pulse width according to the density of the pixel in a subscanning direction may come into inverted relationship before and after a change point that is a location where one-pixel-basis correction is carried out for the image data, and an image forming component configured to form an image based on a signal acquired by carrying out a pulse width modulation according to the corrected density of the image data.

According to the invention of the present application, in the case of correcting image failures accompanying registration deviation using digital image processing, it become possible to carry out satisfactory correction without making unevenness in density or the level difference of one pixel which occurs at the change point arise also in the location where the screen processing has been carried out.

Then, at that time, the PWM is used for the laser beam, and also for one in which the linearity of the density against the pulse width cannot come out easily, carrying out the correction satisfactorily is realized.

Further features of the present invention will become apparent from the following description of exemplary embodiments (with reference to the attached drawings).

BRIEF DESCRIPTION OF THE DRAWINGS

FIGS. 5A to 5C are figures illustrating a data holding method of the profile characteristic;

FIG. 14 is a figure illustrating a principle of screen processing by a dither method;

FIG. 23 is a figure illustrating an example of correction processing less-than-one-pixel-basis.

DESCRIPTION OF THE EMBODIMENTS

Hereinafter, the best mode for carrying out the present invention will be described using drawings.

<Embodiment 1>

Figure 1:
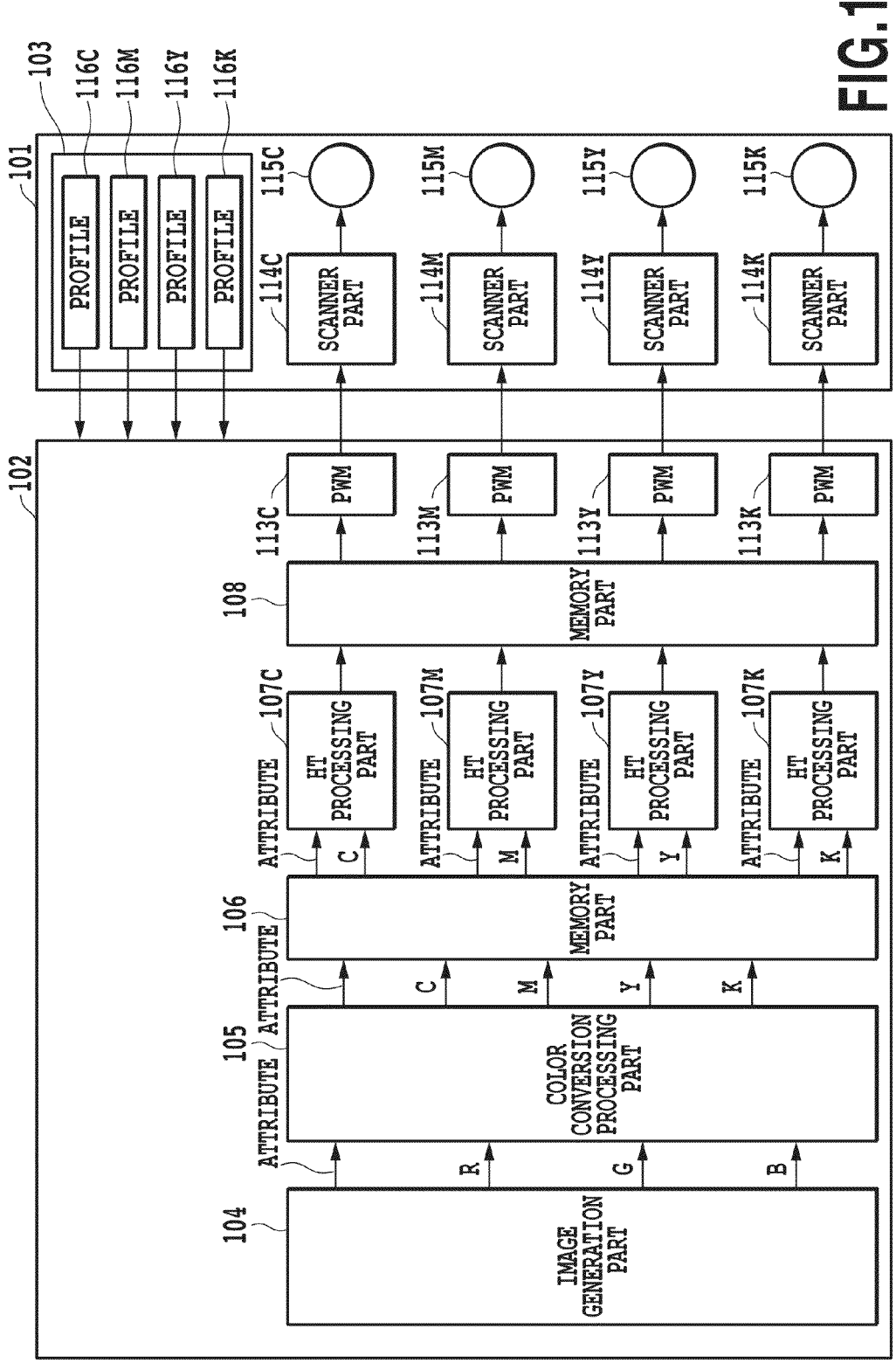
FIG. 1 is a block diagram illustrating a configuration of an image forming apparatus.
Figure 2:
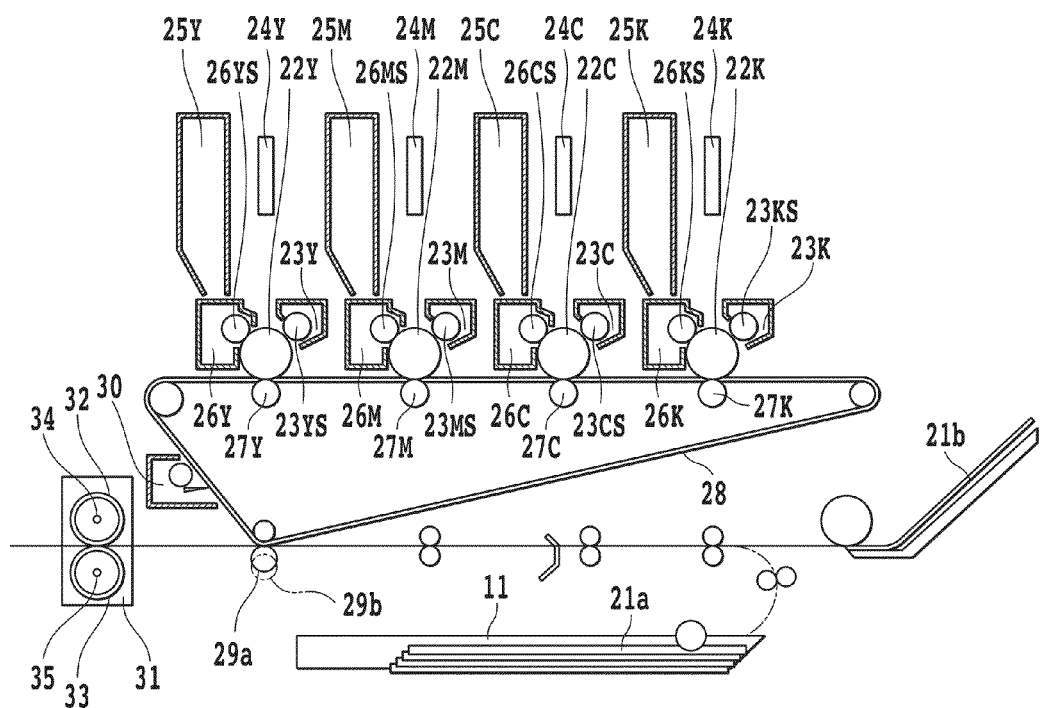
FIG. 2 is a sectional view of the image forming apparatus.

FIG. 1 shows a figure illustrating a configuration of each block associated with electrostatic latent image creation in an electrophotographic color image forming apparatus in the present embodiment. The color image forming apparatus is made up of an image formation part 101 and an image processing part 102, and creates bitmap image information in the image processing part 102, and based on the created bitmap image information, the image formation part 101 carries out image formation onto a recording-medium. FIG. 2 shows a sectional view of the color image forming apparatus using a tandem type electrophotography with an intermediate transfer body 28 adopted. By using FIG. 1, operation of the image formation part 101 in the electrophotographic color image forming apparatus will be described.

The image formation part 101 drives an exposing light depending on an exposure time which the image processing part 102 has processed, forms the electrostatic latent image, and develops this electrostatic latent image to form a monochrome toner image. It superimposes this monochrome toner image to form a multicolor toner image, and transfers this multicolor toner image on the recording medium 11 in FIG. 2 to fix the multicolor toner image on the recording medium.

Reference numerals 23Y, 23M, 23C and 23K in FIG. 2 denote injection charging devices, and in order to make photo conductors 22Y, 22M, 22C and 22K charged for every color of Y, M, C and K, there exist four sets.

Each injection charging device is provided with sleeves 23YS, 23MS, 23CS and 23KS.

Photo conductors 22Y, 22M, 22C and 22K are ones which rotate with a driving force of a not shown drive motor transferred, and the drive motor makes the photo conductors 22Y, 22M, 22C and 22K rotate in an anticlockwise direction depending on the image formation operation. An exposure component is configured to form the electrostatic latent image by irradiating the exposing light to the photo conductors 22Y, 22M, 22C and 22K from scanner parts 24Y, 24M, 24C and 24K, and exposing surfaces of the photo conductors 22Y, 22M, 22C and 22K selectively.

As for developing devices 26Y, 26M, 26C and 26K in FIG. 2, in order to visualize the electrostatic latent image, there exist four units of developing devices which carry out the development for every color of Y, M, C and K, and in each of developing devices, sleeves 26YS, 26MS, 26CS and 26KS are provided. In addition, each developing device 26 is detachable.

The intermediate transfer body 28 in FIG. 2 rotates in clockwise direction in order to receive the monochrome toner image from the photo conductor 22, and as the photo conductors 22Y, 22M, 22C and 22K, and primary transfer rollers 27Y, 27M, 27C and 27K located at the opposed position rotate, the monochrome toner image is transferred thereon.

By applying a suitable bias voltage to the primary transfer roller 27 and by differentiating a revolution speed of the photo conductor 22 and the revolution speed of the intermediate transfer body 28, the monochrome toner image is efficiently transferred on the intermediate transfer body 28. This is called primary transfer.

Furthermore, the monochrome toner image of every station is superimposed on the intermediate transfer body 28. The superimposed multicolor toner image is transferred to a secondary transfer roller 29 as the intermediate transfer body 28 rotates. At the same time, the recording medium 11 is conveyed in a sandwiched state from a medium tray 21 to the secondary transfer roller 29, and the multicolor toner image on the intermediate transfer body 28 is transferred on the recording medium 11. At this time, by applying a suitable bias voltage to the secondary transfer roller 29, the toner image is electrostatically transferred. This is called a secondary transfer. The secondary transfer roller 29, while transferring the multicolor toner image on the recording medium 11, abuts on the recording medium 11 at the position 29a, and after printing processing, is spaced apart to the position 29b.

A fixing device 31, in order to make the multicolor toner image transferred on the recording medium 11 to be melted and fixed thereon, is provided with a fixing roller 32 which heats the recording medium 11 and with a pressurizing roller 33 for bringing the recording medium 11 into a pressure-contact with the fixing roller 32. The fixing roller 32 and the pressurizing roller 33 are formed in a hollow shape, and have heaters 34 and 35 incorporated therein, respectively. The fixing device 31 conveys the recording medium 11 holding the multicolor toner image by the fixing roller 32 and the pressurizing roller 33, and applies heat and pressure to fix the toner on the recording medium 11.

After that, the recording medium 11 after the toner fixing is ejected by a not shown discharge roller to a not shown paper ejection tray, and the image formation operation is completed. A cleaning component 30 is one which cleans the toner remaining on the intermediate transfer body 28, and waste toner remaining after the multicolor toner image of four colors formed on the intermediate transfer body 28 has been transferred on the recording medium 11 is stored in a cleaner container.

Figure 3A:
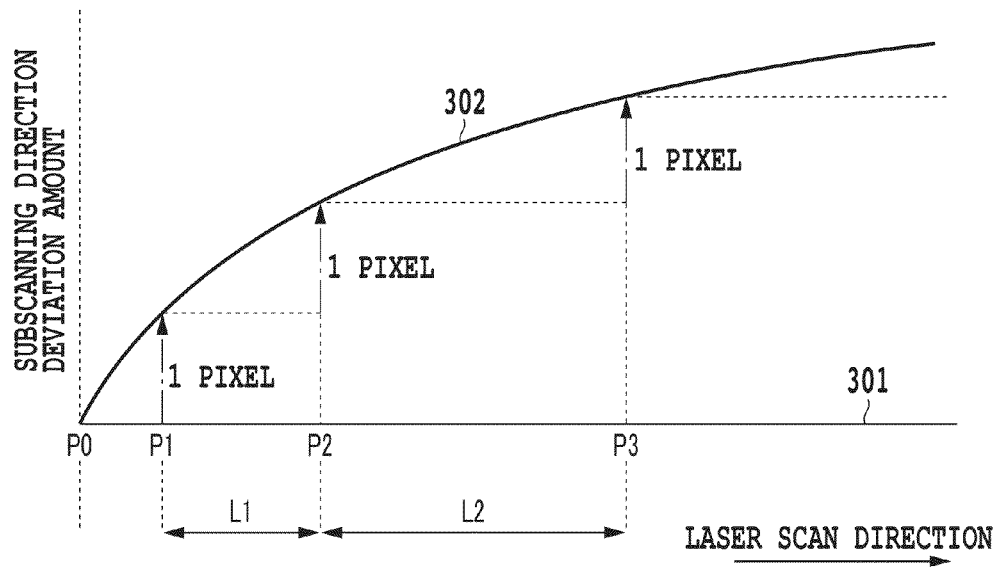
FIGS. 3A and 3B are figures illustrating an example of a profile characteristic of the image forming apparatus.
Figure 3B:
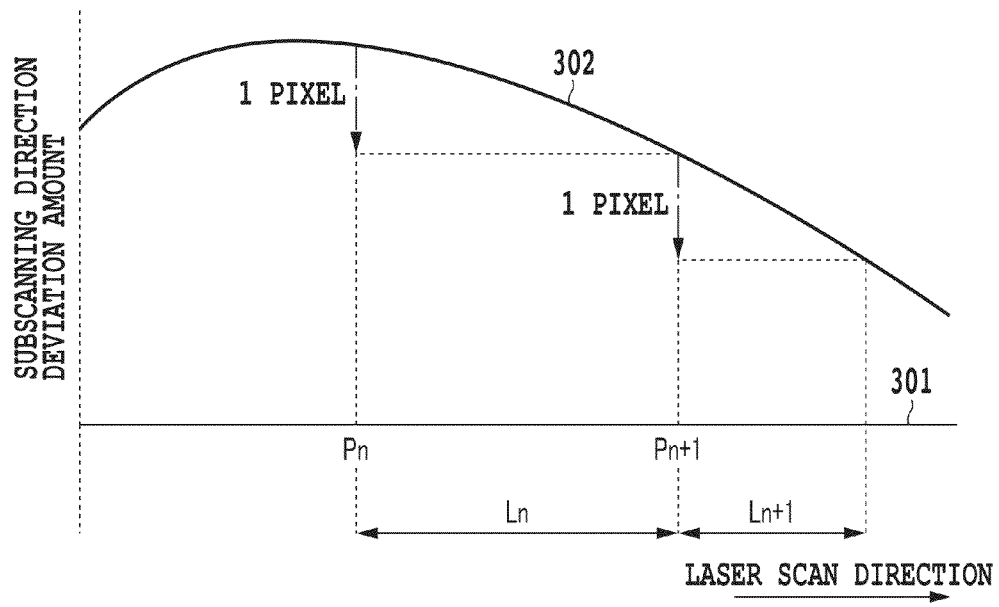

Subsequently, a profile characteristic of a scanning line for every color of the image forming apparatus will be described using FIGS. 3A, 3B, 4A to 4D, and 5A to 5C. FIG. 3A, as the profile characteristic of the image forming apparatus, shows a figure illustrating a region deviated upward (in vertical direction) against a laser scanning direction. FIG. 3B, as the profile characteristic of the image forming apparatus, shows a figure illustrating a region deviated downward against the laser scanning direction. Reference numeral 301 denotes an ideal scanning line, and indicates the characteristic in the case of the scanning being carried out vertically against the rotation direction of the photo conductor 22.

Figure 4A:
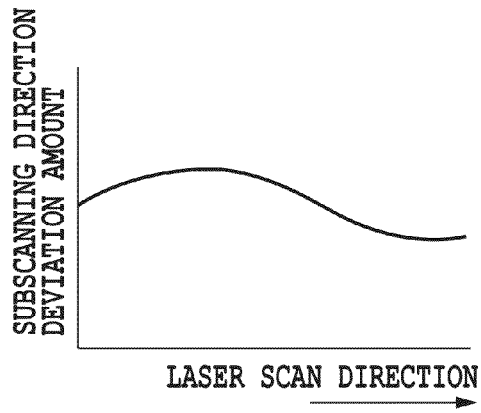
FIGS. 4A to 4D are figures illustrating a relation between a deviation in the image forming apparatus and a correction direction thereof.
Figure 4B:
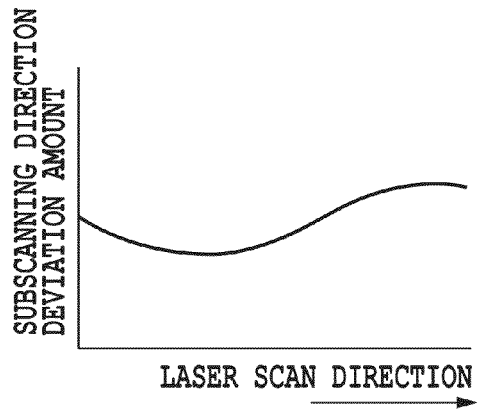
Figure 4C:
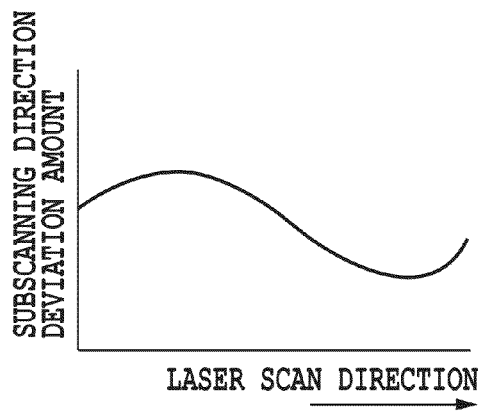
Figure 4D:
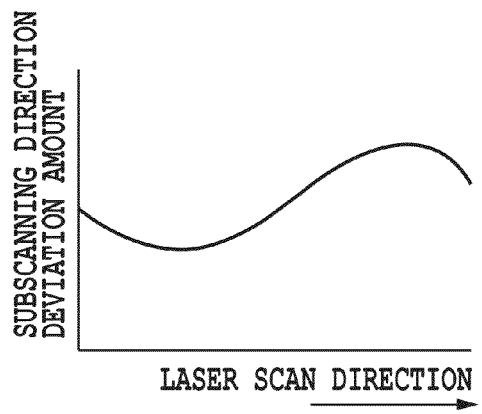

Hereinafter, the profile characteristic in the following description, will be described on the premise of the direction in which correction should be made in the image processing part 102, and however, the definition as the profile characteristic is not limited to this. That is, it is made to be defined as a deviation direction of the image formation part 101, and the image processing part 102 may be made up so that the correction for the reverse characteristic may be carried out. In FIGS. 4A to 4D, depending on the profile definition, a correlation between a figure illustrating the direction on which the correction should be made in the image processing part 102 and a figure illustrating the deviation direction of the image formation part 101 is illustrated. As the direction on which the correction should be made in the image processing part 102, in the case of a curvature characteristic being illustrated like FIG. 4A, the profile characteristic of the image formation part 101 will become one as illustrated in FIG. 4B in which the reverse direction is indicated. On the contrary, as the curvature characteristic of the image formation part 101, in the case of FIG. 4C being shown, the direction in which the correction should be made in the image processing part 102 becomes as illustrated in FIG. 4D.

As a method of holding data of the profile characteristic, for example as illustrated in FIGS. 5A to 5C, a pixel position of a change point (change location) in the main scanning direction and directivity of the variation up to the next change point are arranged in such a way that they are held. Specifically, for the profile characteristic illustrated in FIG. 5A, change points P1, P2, P3, and . . . Pm are defined. The definition of each change point is the point where one pixel deviation occurs in the subscanning direction, and as the direction, there exist a case in which it changes upward and a case in which it changes downward, to the next change point.

For example, the change point P2 becomes the point where the change should be made upward to the next change point P3. Therefore, a change direction in P2 becomes upward (↑) as illustrated in FIG. 5B.

Similarly, also in P3, the change direction becomes upward (↑) up to the next change point P4. The change direction in the change point P4, unlike the direction up to now, becomes downward (↓) As a method of holding this direction data, for example, if it is "1" as the data indicating the upward direction, and "0" as the data indicating the downward direction, the method becomes as illustrated in FIG. 5C. In this case, the number of the data to be held becomes the same as the number of the change points, and if the number of the change points is m, the number of bits to be held will also become m.

Reference numeral 302 denotes an actual scanning line which is caused by the inclination and the curvature resulting from position accuracy and deviation in a diameter of the photo conductor 22, and the position accuracy of an optical system in the scanner part 24 (24C, 24M, 24Y and 24K) of each color illustrated in FIG. 2. As for the image forming apparatus, this profile characteristic differs in every recording device (recording engine) thereof, and furthermore, in the case of the color image forming apparatus, the characteristic differs for every color.

Subsequently, using FIG. 3A, the change point in the region where the laser scanning direction is deviated upward will be described.

The change point in the present embodiment denotes the point which is deviated by one pixel in the subscanning direction. That is, in FIG. 3A, the points P1, P2, and P3 which are deviated by one pixel in the subscanning direction on the upward curvature characteristic 302 correspond to the change points. FIG. 3A is illustrated with P0 as the base. As understood also from the same figure, a distance (L1, L2) between two change points becomes short in the region where the curvature characteristic 302 changes abruptly, and becomes long in the region where the characteristic changes gradually.

Subsequently, using FIG. 3B, the change point in the region where the laser scanning direction is deviated downward will be described. Also in the region indicating the characteristic deviated downward, the definition of the change point denotes the point which is deviated by one pixel in the subscanning direction. That is, in FIG. 3B, the points Pn and Pn+1 which are deviated by one pixel in the subscanning direction on the downward curvature characteristic 302 correspond to the change points.

Also in FIG. 3B, like FIG. 3A, the distance (Ln, Ln+1) between two change points becomes short in the region where the curvature characteristic 302 changes abruptly, and becomes long in the region where the characteristic changes gradually.

Thus, the change point is closely related to a change degree of the curvature characteristic 302 which the image forming apparatus has. Therefore, in the image forming apparatus with an abrupt curvature characteristic, the number of change points increases, and on the contrary, in the image forming apparatus with a gradual curvature characteristic, the number of change points decreases.

As already described, since the curvature characteristic which the image forming apparatus has is different also for every color, the number and position of the change points thereof differ from each other. The differences resulting from colors will cause the registration deviation to appear in the image where the toner image of all the colors has been transferred on the intermediate transfer body 28.

Subsequently, using FIG. 1, processing of the image processing part 102 in the color image forming apparatus will be described. An image generation part 104 creates raster image data of which print processing is possible from print data received from a not shown computer apparatus or the like, and outputs the data for every pixel as RGB data and attribute data indicating data attribute of each pixel. The attribute data holds attributes such as a character, a thin line, CG and a natural image. The image generation part 104 may be made up so as to process, other than image data received from the computer apparatus or the like, the image data from a reading component which is made up inside the color image forming apparatus. The reading component here includes a CCD (Charged Couple Device) or a CIS (Contact Image sensor) at least. The reading component may be made up so as to include together a processing part which carries out a prescribed image processing for the read image data. Without making it up inside the color image forming apparatus, it may be made up so as to receive data from the reading component via a not shown interface.

Reference numeral 105 denotes a color conversion part and converts the RGB data into CMYK data corresponding to toner colors of the image formation part 101, and stores the CMKY data and the attribute data in a memory part 106 which has a bit map memory. The memory part 106 is a first memory part made up in the image processing part 102, and once stores the raster image data for which the print processing is carried out. The memory part 106 may be made up of a page memory which stores image data for one page, and may be made up as a band memory which memorizes data for two or more lines.

Reference numerals 107C, 107M, 107Y and 107K denote HT (half toning) processing parts and carries out, for the attribute data and the data of each color outputted from the memory part 106, the interpolation processing which is the change less-than-one-pixel-basis, and carries out the conversion of the tone of the input into pseudo half tone expression by half toning processing. The interpolation processing in the HT processing part 107 uses pixels before and after change points corresponding to the curvature characteristic which the image forming apparatus has. Details of the interpolation processing and the half toning will be described later.

Reference numeral 108 denotes a second memory part included inside the image forming apparatus, and stores N-value data processed by the HT processing part 107 (107C, 107M, 107Y and 107K). N indicates a number smaller than a tone number of the raster image data created by the image generation part 104. In the case of a pixel position to be image-processed after the memory part 108 being a change point, the change for one pixel is carried out at the time of being read from the memory part 108. Details of the change for one pixel carried out in the memory part 108 will be described later. In the present embodiment, although each of a first memory part 106 and a second memory part 108 was described as a separate constituent, a common memory part may be made up inside the image forming apparatus.

Figure 12A:
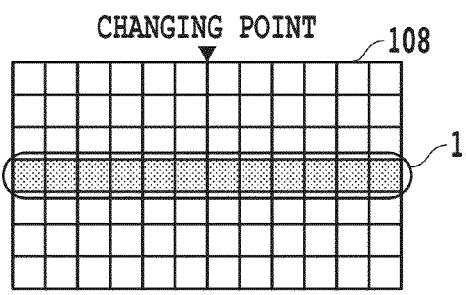
FIGS. 12A to 12C are figures illustrating schematically a data status which a memory part holds.
Figure 12B:
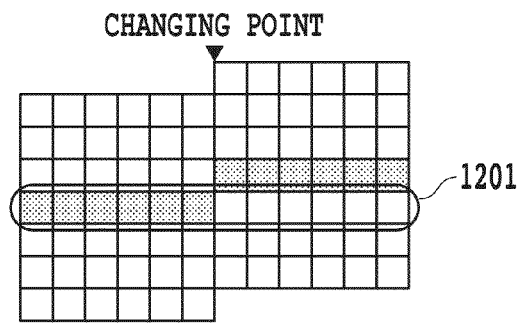
Figure 12C:
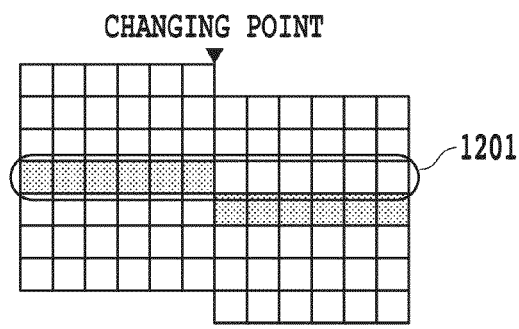

FIG. 12A shows a figure illustrating schematically a state of data which the memory part 108 holds. As illustrated in FIG. 12A, in the state which the memory part 108 has stored, without depending on the change direction as the image processing part 102, or on the curvature characteristic of the image formation part 101, the data after the processing by the HT processing part 107 are held. At the time of the 1201 line illustrated in FIG. 12A being read out, in the case of the profile characteristic as the direction to be corrected in the image processing part 102 being upward, the 1201 line is found to be in the state where the line is displaced upward by one pixel with the change point as the boundary line as illustrated in FIG. 12B. In the case of the profile characteristic as the direction to be corrected in the image processing part 102 being downward, the image data of the line 1201, at the time of being read from the memory part 108, is found to be in the state where the line is displaced downward by one pixel with the change point as the boundary line as illustrated in FIG. 12C.

Reference numeral 113 denotes PWM, and the image data for every color which is read out from the memory part 108 after the change by one pixel being carried out, is converted into the exposure time of the scanner parts 114C, 114M, 114Y and 114K. Then, the image data after the conversion is outputted by a printing part 115 of the image formation part 101.

The profile characteristic data which is already described as illustrated in FIG. 5C, inside the image formation part 101, as attributes which the image forming apparatus has, is held in an inner part thereof. Then, the image processing part 102 is one where the processing is carried out according to the profile characteristic which the image formation part 101 holds (profiles 116C, 116M, 116Y and 116K).

Figure 6:
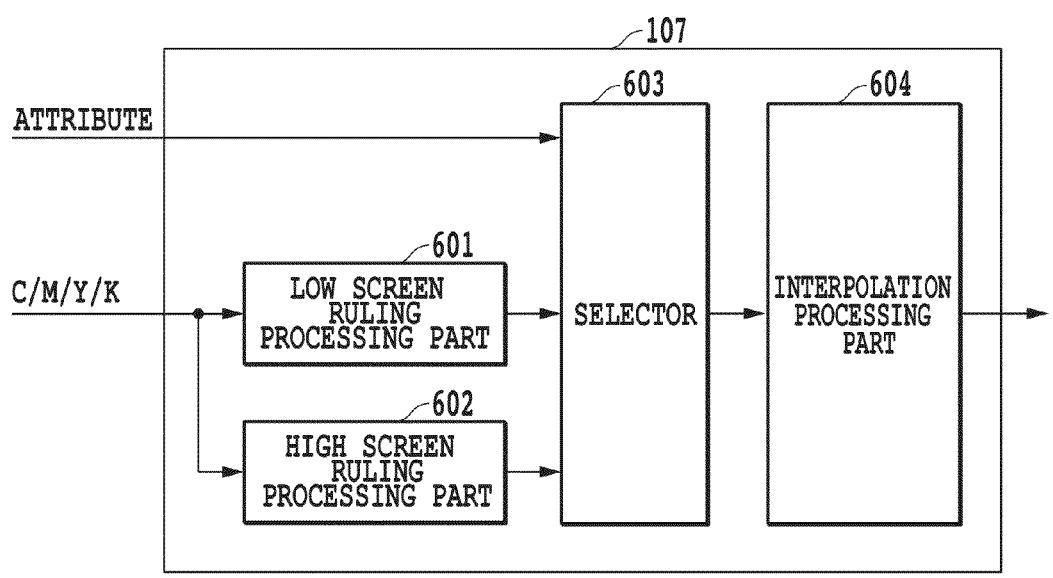
FIG. 6 is a block diagram illustrating a configuration of a HT processing part in Embodiment 1.

Subsequently, using FIG. 6, operation of the HT processing part 107 (107C, 107M, 107Y and 107K) of the image processing part 102 will be described in detail. Since all of 107C, 107M, 107Y and 107K have the same structure, they will be described as the HT processing part 107 in the following.

The HT processing part 107 receives the image data of the corresponding color data from the CMYK data and the attribute data, and gives the image data to screen processing parts 601 and 602.

The screen processing part 601, 602 receives the image data, and in order to convert a continuous tone image into a halftone image having fewer tone number, carries out the half toning by screen processing.

With reference to attribute information at this time, for example, for an image in which details of a line is considered to be important like a character, such screen processing as exceeds 200 lines and has higher resolution (high-number-of-lines screen processing part 602) is carried out. On the contrary, in the case of the attribute where it is not the case, such a screen (the low screen ruling processing part 601) as is higher in tone, lower in resolution and less than 200 lines, is applied. After that, in a selector 603, with reference to the attribute, for a attribute portion of a character or a line, an output for which the high screen ruling processing has been carried out is selected, and for the attribute which is not the case, an output for which the low screen ruling processing has been carried out is selected, and the selected output is outputted to an interpolation processing part 604. After that, for the image for which the screen processing has been carried out, the interpolation processing is carried out in the interpolation processing part 604, and level difference smoothing (interpolation processing less-than-one-pixel-basis) is carried out.

Figure 7:
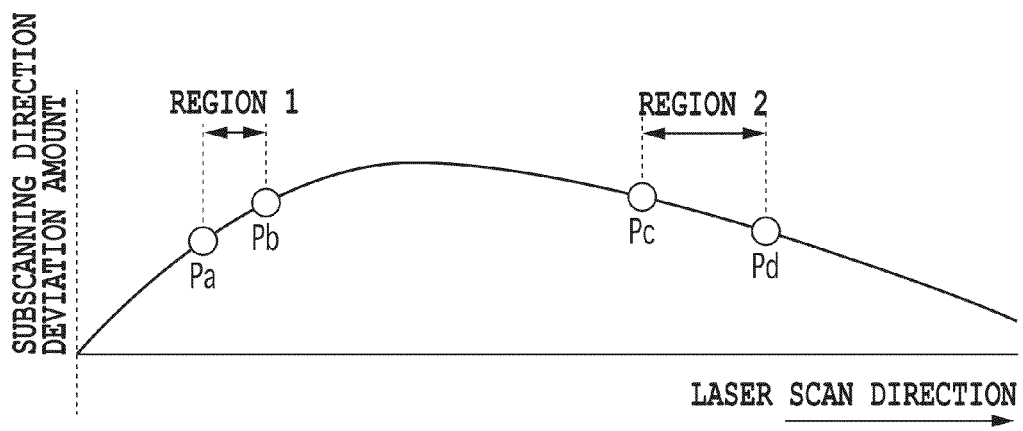
FIG. 7 is a figure illustrating an example of a change point and an interpolation processing region.
Figure 8:
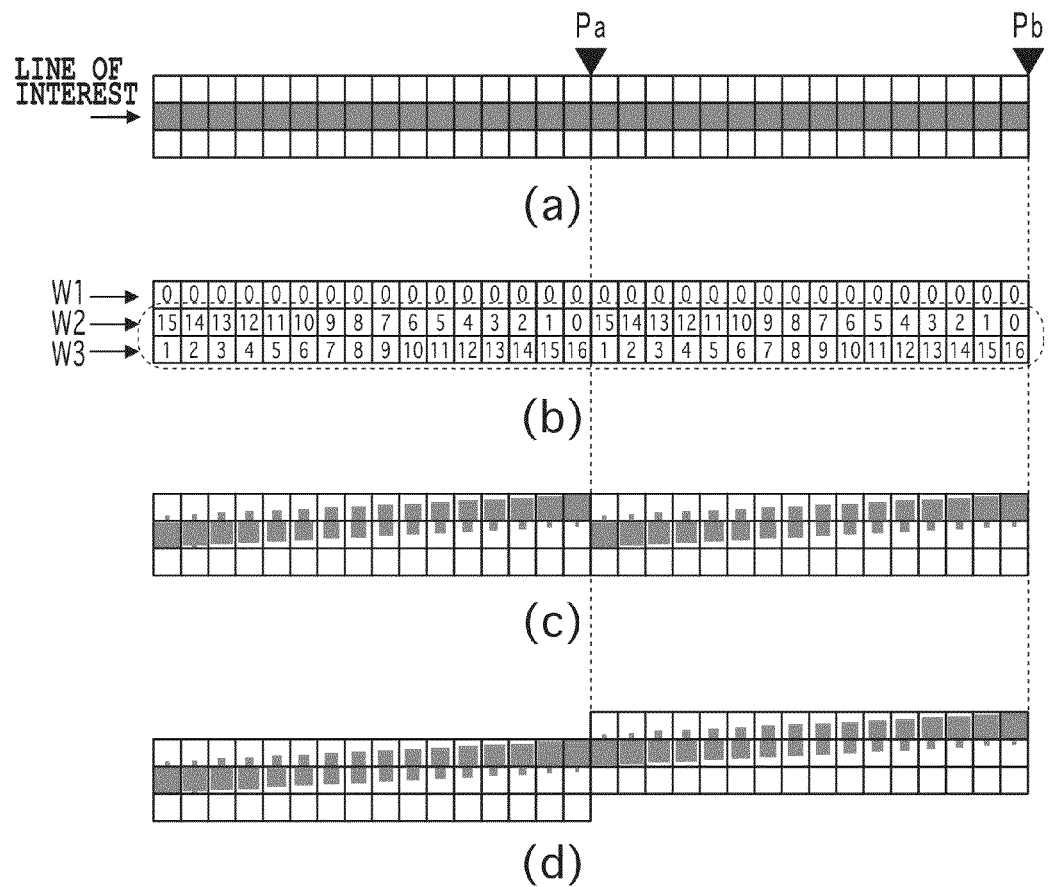
FIG. 8 is a figure illustrating schematically processing according to the conventional change point of a pixel.

Using FIG. 7 and FIG. 8, a method of interpolating at the change point will be illustrated.

FIG. 8 shows an explanation of the interpolation processing which is carried out conventionally, and note that the figure is used for comparing with the present embodiment. FIG. 7 shows a figure illustrating the curvature characteristic of the image forming apparatus against the direction of laser scanning. A region 1, as the image processing part 102, is the region where the correction must be carried out upward, and on the contrary, a region 2, as the image processing part 102, is the region where the correction must be carried out downward. In the following description of the interpolation processing, as a matter of convenience for the description, the minimum interval between two change points shall be 16 pixels, and however, the present invention is not limited to this. That is, it may be made an arbitrary-number-of-pixels interval, or a power-of-2 pixel interval for circuitry reduction.

A pre-change-image before and after change point Pa in an example in FIG. 7, that is, an input-image-data configuration of the halftone processing part 107 is illustrated in (a) of FIG. 8.

An output-image-data configuration of the halftone processing part is illustrated in (c) of FIG. 8. In FIG. 8, a line of interest is the center line in the 3 lines of image data which are illustrated in the figure. Change processing exceeding one pixel is carried out at the change point at the time of being read from the memory part 108. Therefore, if processing filling up the gap is not carried out, a pixel configuration before and after the change point Pa will have caused a large level difference corresponding to one pixel to appear with the change point Pa as the boundary line.

If the simplest structure is considered in the case of carrying out this interpolation processing, by carrying out the following computation for the line of interest and pixels located vertically in the subscanning direction thereof, it can be realized.

A computing equation to be used for interpolation is given by formula 1

(Interpolation pixel values)=W1×(pixel values of 1 line preceding the line of interest)+W2×(pixel values of the line of interest)+W3×(pixel values of 1 line succeeding the line of interest)    (Formula 1)

* W1, W2, and W3: arbitrary weighting factors

The weighting in the present description, as illustrated in (b) of FIG. 8, is described so that the total sum of 2 pixels in the subscanning direction which become targets may become 16 in accordance with the minimum values of the change point. It is necessary to carried out the interpolation so that, before and after the change point Pa in FIG. 7, the pixels of the line of interest may shift upward in the subscanning direction. Accordingly, for the preceding line of the line of interest, the weighting value is set to 0, and for the line of interest and the succeeding line of the line of interest, the weighting value is set up so that the pixel of the succeeding line may shift to the side of the line of interest gradually in (b) of FIG. 8. Carrying out processing with the line of interest displaced allows the interpolation processing to be carried out so that pixels may shift upward in the subscanning direction.

In the example of the present description, a conceptual diagram of the interpolation pixel value given by the above formula 1 is illustrated in (c) of FIG. 8. By the interpolation by formula 1, before the change point Pa, the nearer the pixel is to the change point Pa, the more it is influenced by the pixel value of the succeeding line, and the further the pixel is from the change point Pa, the more strongly it receives the influence of the line of interest, that is, a black data line.

As for the pixel after the change point Pa, it results that the nearer the pixel is to the change point Pa, the more strongly it is influenced by the line of interest, and the further the pixel is from the change point Pa, the more strongly it is influenced by the succeeding line of the line of interest.

Finally, as illustrated in (d) of FIG. 8, in the memory part 108, the change processing in one-pixel-basis is carried at the time of outputting of the memory part 108. Since the change processing exceeding one pixel is carried out at the time of being read from the memory part 108, it results that the large level difference before and after the change point Pa which had appeared so far disappears at this point.

As illustrated in (d) of FIG. 8, the line of 1 dot of the resolution (for example, 600 dpi) of the inputted image is converted (corrected in density) into a half dot of 2 dots in the subscanning direction. A specific method of reproducing this half dot is the PWM illustrated by 113C, 113M, 113Y and 113K, and is realized by modulating the laser exposure time. For example, in the case of the PWM having a 4-bit width and 16 tones per one pixel, it controls the laser exposure time while dividing the pulse width into sixteen for the tone 0 to 15, and switching them gradually.

Figure 9:
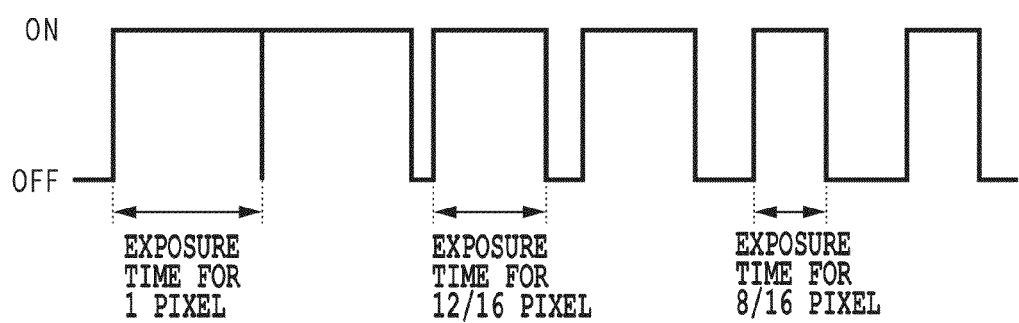
FIG. 9 is a figure illustrating schematically an aspect of pulses of a PWM value.

An aspect of the control of the laser exposure time is illustrated in FIG. 9. In FIG. 9, 16-division of the pulse of the exposure time for one pixel is carried out, and according to the pulse width of the 16-division, the exposure time is controlled. In the figure, in the next pulse, the aspect where 12 steps are made to be ON is illustrated, and in the next pulse thereof, 8 steps are made to be ON. Although, in the figure, a theoretical rectangular waveform is illustrated, in a actual electric signal, the waveform becomes blunt, and at the rising and falling edge part, the exposure equivalent to ON may not always be able to be carried out.

In the following description, the pixel where the exposure by the PWM is carried out during all over the time of 16/16 is called a full dot, and the pixel where the exposure is carried out during the time of 1/16 to 15/16 is called a half dot.

Figure 10A:
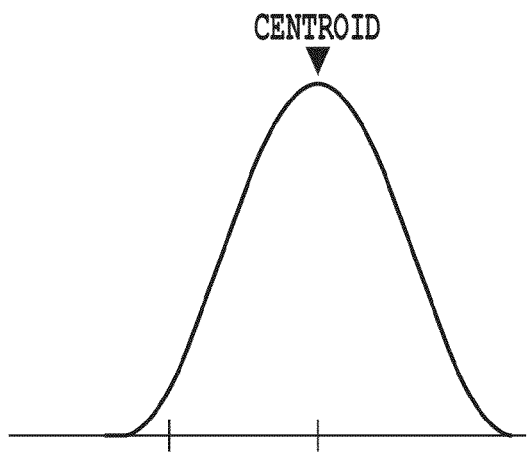
FIGS. 10A to 10C are figures illustrating schematically an exposure image against a PWM value.
Figure 10B:
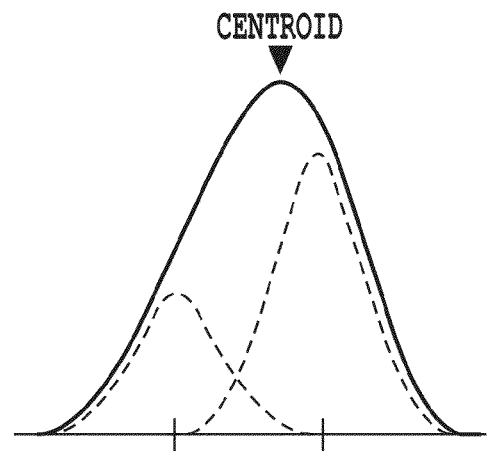
Figure 10C:
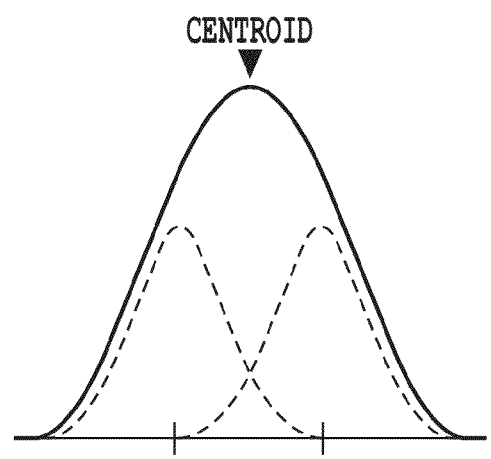

In FIGS. 10A to 10C, an aspect of centroid movement using the half dot by laser power modulation is illustrated. This figure illustrates the aspect where the centroid is displaced in an order of FIG. 10A, FIG. 10B and FIG. 10C, from the right scanning line to the left scanning line gradually. A curved line indicated with a dotted line indicates an exposure image formed by carrying out one laser scan, and a curved line indicated with a continuous line indicates the exposure image including also an influence of an adjoining laser exposure. The centroid movement in the interpolation processing is carried out based on deviation amount from a laser scanning position. It seems that the centroid movement to the left occurs surely with an integral value kept, and however, an generated shape is not always in agreement, and it may appear as a variation of the density. Therefore, even if density preservation is carried out from the view point of a signal value or an amount of integrated light, an outputted image may not maintain the density. That is, against an exposure amount or the exposure time, a situation where it is hard to make the linearity of the density come out may arise.

That is, this means that, even if what is exposed during the time of 6/16 adjoins what is exposed during the time of 10/16, it is difficult to always realize the density substantially equal to that in the exposure by 16/16. Even by a size of an adjoining dot, it may be difficult to express the linearity. For example, even though, in the case of a line having sufficiently thick 10-dot width, it is possible to maintain line width uniformity with the level difference canceled by the interpolation pixel value given by the above formula, in the case of interpolating a line having 1-dot width by the same formula, a thickness of the line will have changed depending on the weighting factor according to density variation. By adjusting these individually, method of calculating a PWM amount to be outputted linearly, method of increasing a number of divisions of the PWM from the above-mentioned 16 in order to increase the tone number, and others are considered. However, because, depending on an environment, a state of the developing device or a durability state of a printer, a method of adjustment also varies, it is difficult to guarantee the linearity.

That is, in the actual condition, rather than processing guaranteeing the linearity itself against the density, in the state using the PWM where it is hard for the linearity of the density to come out, needed is a method of maintaining density uniformity with the level difference before and after the change point of one dot small.

Although it is hard for the linearity here to come out, as a prerequisite, the following things can be said. That is, although the linearity of the density is not guaranteed against the pulse width of 0 to 16, the pulse width of 2 rather than 0, 3 rather than 2, or 16 rather than 15, will allow a thick dot to be formed. Also with respect to adjoining of dots, if it is hard for the linearity to come out, for example, the density at the time when two dots each having a pulse width of 13 adjoin each other in subscanning direction, and the density at the time when a dot having a pulse width of 16 and a dot having a pulse width of 10 adjoin each other in the subscanning direction where the sum total value is the same as 26, may be different from each other. However, even if it is said that it is hard to make the linearity come out, the density of 2 dots where the dot of the pulse width of 10 is located right above the dot having the pulse width of 16 in the subscanning direction, and the density of 2 dots where the dot of the pulse width of 10 is located right below the dot having the pulse width of 16 in the subscanning direction, are substantially equivalent.

Figure 11:
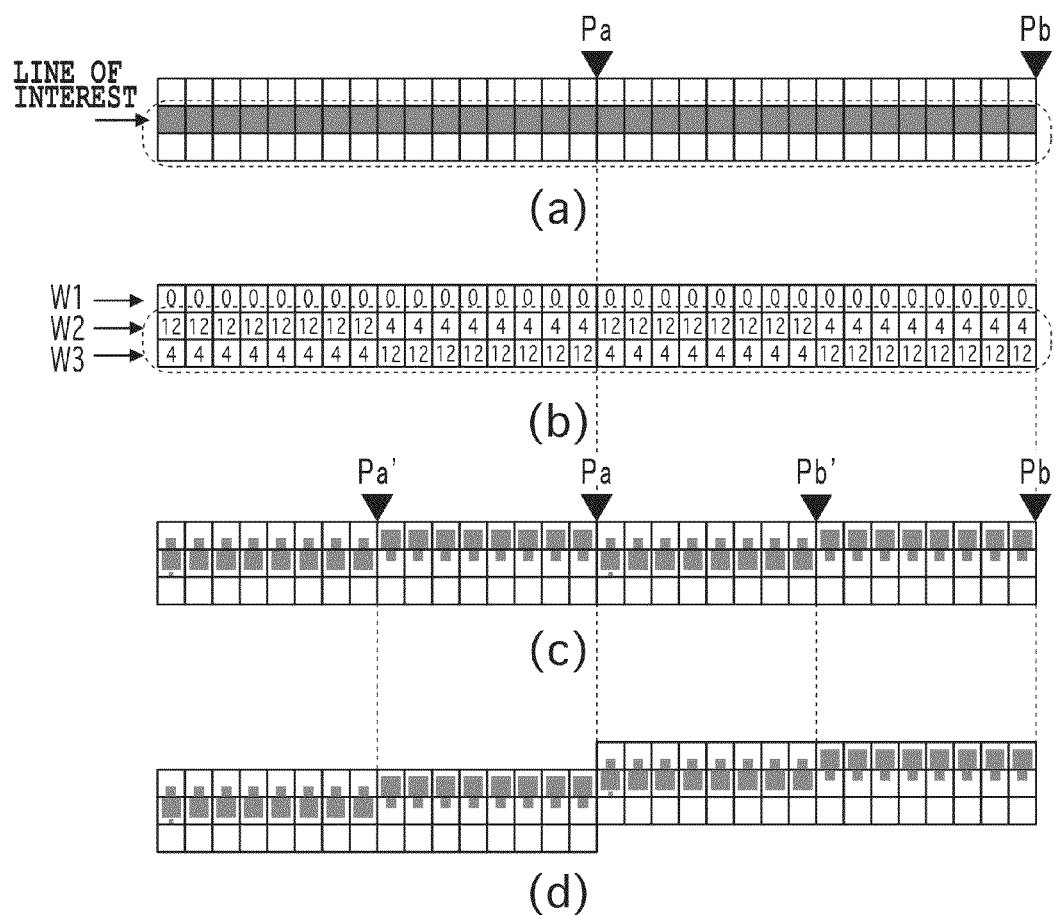
FIG. 11 is a figure illustrating schematically the processing according to change of a pixel in Embodiment 1.

Then, in the present embodiment, combinations of half dots are minimized in order to maintain the density uniformity. Accordingly, against an input as illustrated in (a) of FIG. 11, the weighting factor W indicated in (b) of FIG. 11 are set up. FIG. 11 shows a figure compared with a conventional example of FIG. 8, and Pa and Pb in the figure, as illustrated in FIG. 7, indicates the change point where the change in one-pixel-basis is carried out upward in the subscanning direction (at the side of preceding line). A conceptual diagram of an output acquired by setting up the weighting factor W as illustrated in (b) of FIG. 11 becomes as illustrated in (c) of FIG. 11. In this case, an input of one dot is always expanded into 2 dots in the subscanning direction, and moreover, the vertical ratio is limited to 2 ways of 1:3 or 3:1.

Therefore, it results that, as for the line of one dot which is illustrated in the figure, a dot having the exposure time of 4/16, and a dot having the exposure time of 12/16 are made to perform vertical inversion at the change point and the center point of the change points (Pa', Pb' in the figure). Therefore, between the two factors, only by the way of locating dots vertically, the density based on half dots becomes equivalent, and the level difference is smoothed into the line having 1-or-less dot.

Figure 13:
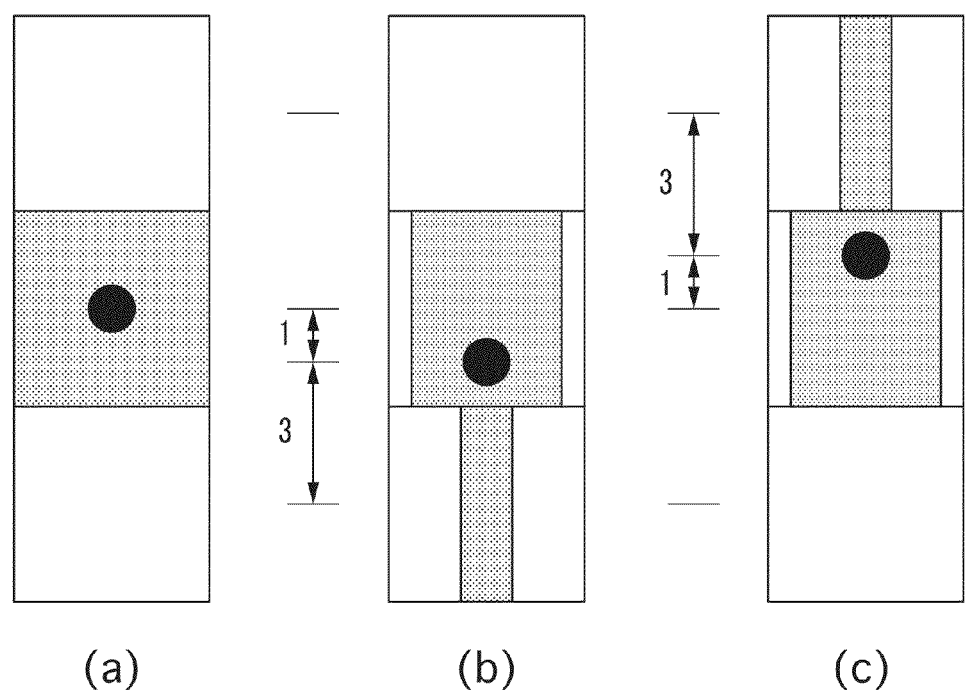
FIG. 13 is a figure illustrating schematically an aspect of centroid position movement of a dot.

In FIG. 13, details are described with respect to the state before and after the change point Pa. Against an input of the (a) in FIG. 13, the centroid is displaced downward by ¼ pixel in the (b), similarly, the centroid is displaced upward by ¼ pixel in the (c). That is, a distance between centroids (b) and (c) corresponds to ½ pixel, and the level difference which sandwiches the change point Pa is smoothed into the level difference of ½ pixel.

Finally, as illustrated in (d) of FIG. 11, in the memory part 108, the change processing in one-pixel-basis is carried out at the time of outputting from the memory part 108. In the same way as the previous description, since the change processing exceeding one pixel is carried out at the time of being read out from the memory part 108, it results that the large level difference before and after the change point Pa disappears at this point.

For example, in the example described in FIG. 11, it is possible that, in the case of a laser scanning resolution of 600 dpi, the level difference which occurs at the change point is made small to an equivalent 1200 dpi as the half thereof (smoothed into the level difference of ½ pixel).

Since, as for the PWM tone as mentioned above, it is hard for the linearity of the density to come out, it is considered thoroughly that the centroid movement by ¼ pixel have not been achieved even by creating 2 dots each having a ratio of 4:12 and paying attention only to 1 dot part thereof. In that case, unless a relation of the density to the exposure time is inverted, it is guaranteed at least that the centroid movement has been settled in the level difference which is smaller than one pixel. When it is hard for the linearity of the density to come out in the case of using the PWM tone, the most suitable centroid movement ratio may not always be 1:3 (4:12) as mentioned above. In combination with the tone of the PWM, it is also possible to displace the ratio like 3:13, and use a combination where the sum total thereof does not become 16 as 4:11.

In this way, in the present embodiment, it is characterized in that 1 dot is converted into 2 dots each having a half dot, where the way of locating the half dots maintain the relation of the vertical inversion in the subscanning direction, and the centroid movement less than 1 dot is made to be carried out. Thereby, even when it is hard for the linearity to come out in the relation between the PWM tone and the density, it is possible that the level difference is made into less than 1 dot without causing unevenness in the line width and density.

It is described here, as a example, that the image data is corrected upward, and however, it is also possible as a matter of course that, while the way of locating the half dot is made to be inverted in the subscanning direction and the density is made to be equivalent, the image data is corrected downward.

<Embodiment 2>

In the embodiment 1 above, described was an example where the interpolation processing, to the line or the full dot having one dot, gives half dots maintaining the relation of vertical inversion so that unevenness in density or thickness changes may not be caused, carries out the centroid movement less than one dot, and smoothes the level difference. In the case of the inputted image on which carried out was processed by the one bit binary halftone of all-exposure-ON and all-exposure-OFF (2 ways of 16/16 and 0/16) by using the PWM of 16 steps, it is possible to carry out the centroid movement as the above-mentioned embodiment 1.

That is, the method of Embodiment 1 is effective for a one bit, that is, a binary image for which even in the case of the tone number of the input being, for example, 256 tones per pixel, etc., halftone processing is always carried out, and conversion thereof into ON or OFF is always carried out. However, the inputted image may include, other than the above full dot image, one which is N-value-ized, specifically sexadecimal-ized by 4 bits including many of a half dot for example, in the halftone processing. In such a case, it is difficult to carry out the centroid movement simply.

In Embodiment 2, with 4-bit halftone screen processing as an example, described is a configuration in which, for a dot expressing the 4-bit halftone, the way of locating the half dot maintains the relation of the vertical inversion with the change point as a border, and the density equivalence is realized.

In the present embodiment, details are described with respect to the HT processing part illustrated in 107, and the description before and after the processing is the same as Embodiment 1, and therefore, is omitted.

The screen processing in the HT processing part 107 described also in Embodiment 1 is based on a dither method where arbitrary threshold values are read from a dither matrix with a plurality of threshold values arranged, and inputted image data is N-value-ized by being compared with the threshold values.

Figure 14:
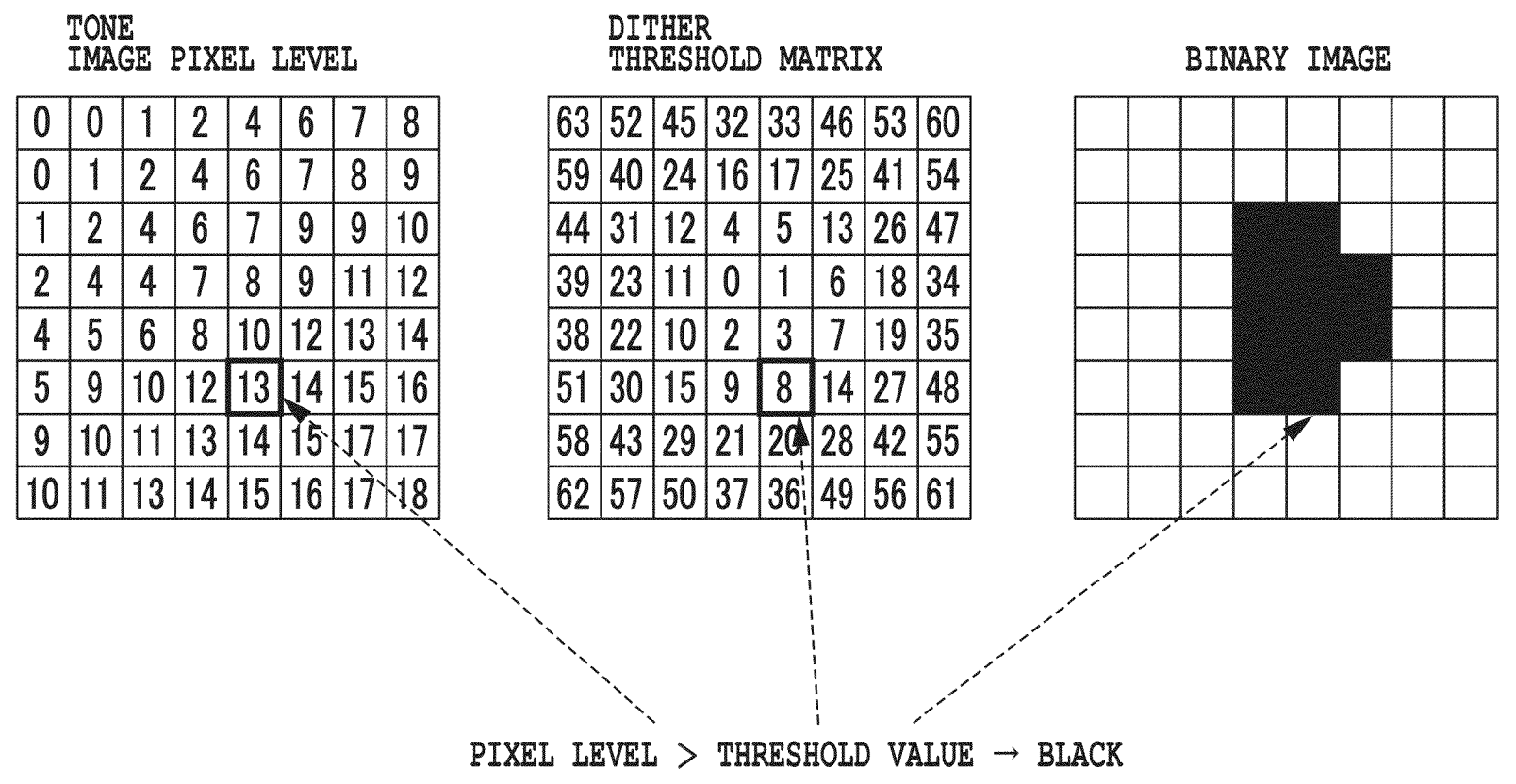

Using FIG. 14, with respect to the dither method, a detailed principle will be described. The continuous tone image of the input (for example, an 8-bit 256 tone image) is divided into a block of N×M (8×8 in the figure). After that, a magnitude comparison of the tone value of every pixel in the block is carried out with each threshold value in the dither matrix in which threshold values have been arranged in same N×M size as the block, and for example, 1 will be outputted if a pixel value is larger than a threshold value, and 0 will be outputted if it is not more than the threshold value. By carrying out this against all the pixels for every size of the matrix, it becomes possible to carry out binarization of the overall image. In the electrophotographic color image forming apparatus, in order to realize stable dot reproducibility on a recording medium, the dither matrix where dots are concentrated is periodically used. On the contrary, if dots have been diffused or isolated dots each of which has no dots in the periphery thereof increases, a stable dot reproducibility is not acquired. In the case of the high screen ruling described in the above embodiment 1, the dot space is narrow, and on the contrary, in the case of the low screen ruling, the dot space becomes wide.

Figure 15A:
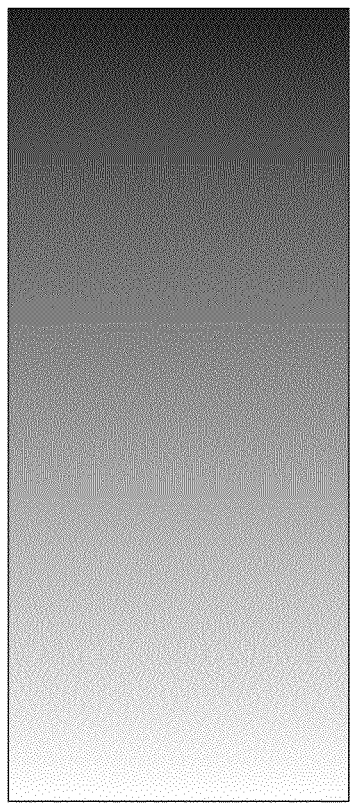
FIGS. 15A and 15B are figures illustrating schematically an aspect of an input/output of an image by the dither method.
Figure 15B:
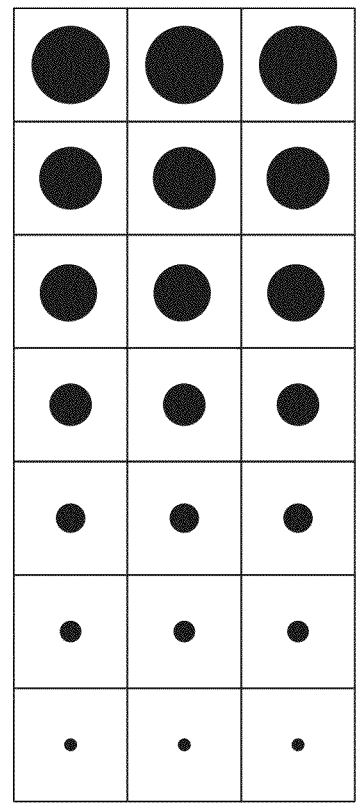

A schematic diagram of tone change using a dither matrix is illustrated in FIGS. 15A and 15B. A continuous tone image as illustrated in FIG. 15A is expressed as a binary image as illustrated in FIG. 15B.

By expanding this threshold value matrix to 15 sheets, and preparing a threshold value of one tone per a sheet, an output of a 16-tone-4-bits-screen becomes possible.

Usually, in a cycle of the screen, certain one dot begins to light up from a low density toward a high density, and after the dot has reached a full dot, dots in the circumference of the full dot begins to light up. That is, the 2nd and subsequent dot after the full dot will always adjoin the full dot. In this way, by lighting up dots with them centralized, a stable dot formation can be realized, and the more sparse dots are, the fewer isolated dots become, and it is possible to expresses the tone in a stable state. The screen is formed in the order of the lighting of dots to express the intermediate density.

If for such a screen image, multiplying by weighting factors and computing are carried out using a method indicated in Embodiment 1, a region of half dots is diffused vertically, and with a change point sandwiched, a texture of the screen is deformed and a tone gap will have been caused.

Figure 16:
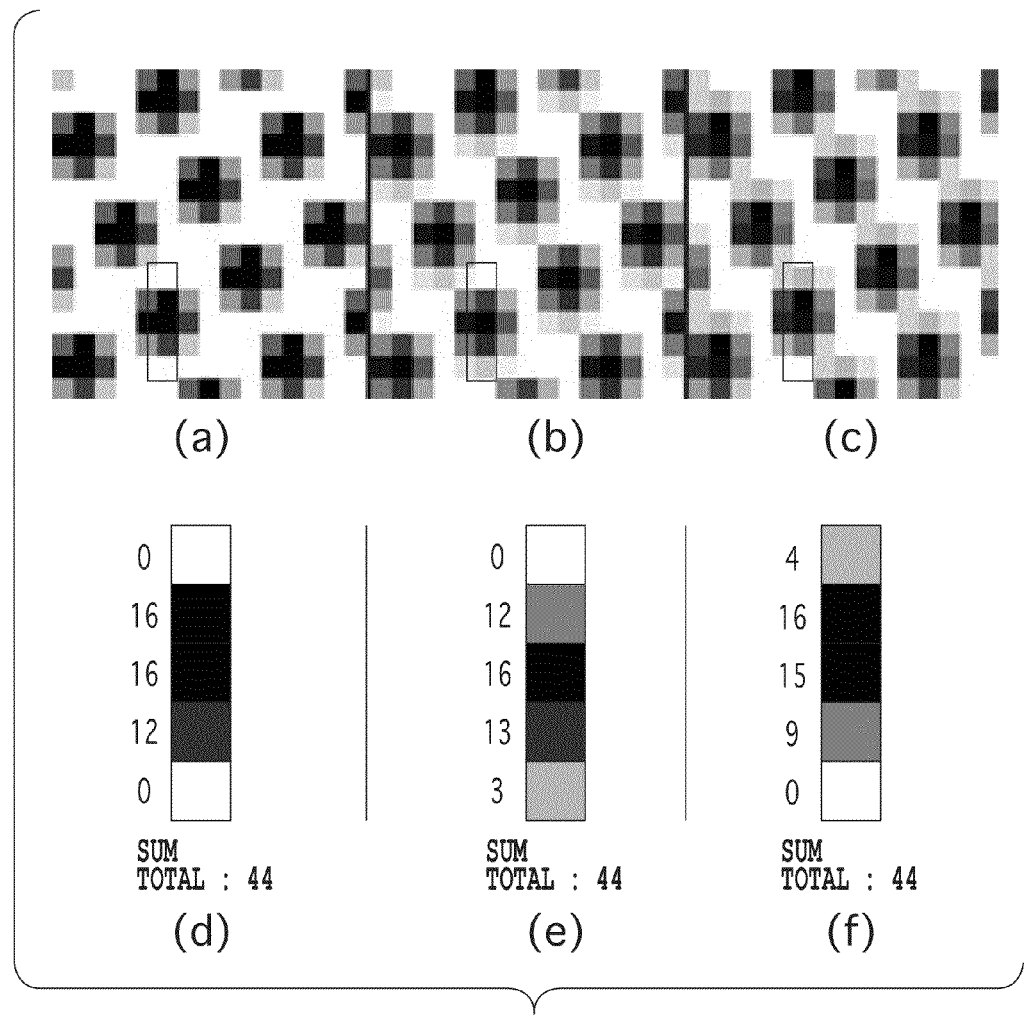
FIG. 16 is an example of an image data where the change is carried out for the screen image.

In FIG. 16, an image after carrying out the screen processing, and against it, an image in which weighting factors with the change point Pa as a border are switched, as illustrated in FIG. 11, are illustrated. An image illustrated in (a) of FIG. 16 becomes an example of an image after the 16-tone-4-bits-screen mentioned above. An image in which, for this image, weighting computation described in Embodiment 1 is carried out, and the centroid is displaced downward by ¼ pixel, will become (b). Similarly, an image in which the centroid is displaced upward by ¼ pixel, will become (c). (d) of FIG. 16 illustrates a sample taken out from a part of pixels of (a) of FIG. 16, and the PWM value thereof. Similarly, (e) of FIG. 16 illustrates a sample taken out from a part of pixels of the same position of (b) of FIG. 16 as (d) of FIG. 16, and (f) of FIG. 16 illustrates a sample taken out from a part of pixels of the same position of (c) of FIG. 16 as (d) of FIG. 16. In this way, it seems that, by carrying out the weighting computation even for an image after the 16-tone-4-bits-screen, the centroid moves on a digital data, and the density of the sum total is also held.

However, in a state where it is hard for the linearity against the PWM to come out easily, that is, in a state where, twice the density has not come out in 4 for 2, or the density equivalent to 9 does not come out even if dots of 4 and 5 adjoins each other, the way of locating a half dot for the dot of the screen will have changed with the change point as a border. As a result, on the image outputted, the density variation is caused with the change point as a border, and will have become apparent as inconsistencies.

Although, before the interpolation processing, the region was expanded with dots centralized, the dots are diffused under the influence of the interpolation, and the region of half dots will have expanded. In the case of FIG. 16, although in (d), two full dots and one half dot existed, in (e) and (f), it has been expanded to one full dot and three half dots. In this way, when the weighting computation described in Embodiment 1 is carried out for an image where the halftone processing of a multiple-value tone is carried out, and the interpolation processing is carried out, it becomes, as a result, difficult to create a stable dot, and the stability of half tone density will also have been impaired.

Then, in order that the density of a dot is not made to be changed with the change point as a border, a method of displacing the centroid with the way of locating a half dot or a degree of concentration of dots maintained will be needed.

Figure 17:
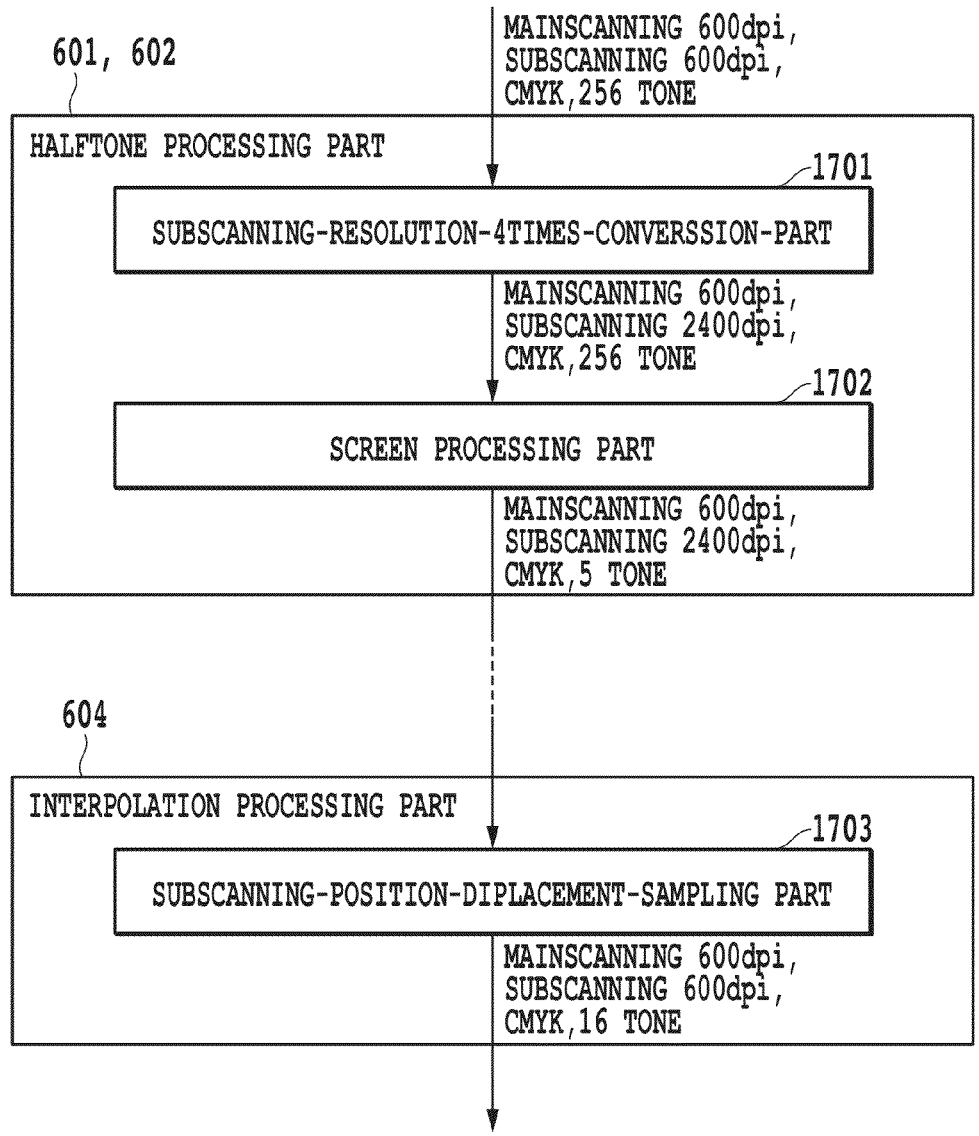
FIG. 17 is a block diagram illustrating a detailed configuration of the HT processing part in Embodiment 2.

Then, in the present embodiment, a method to maintain a vertical symmetrical figure of dots which appears on both sides with the change point as a border by exerting ingenuity for the screen processing, will be described using FIG. 17.

In a halftone processing part 601, first in a subscanning-resolution-4 times-conversion-part 1701, the inputted multi tone raster image data of each CMYK color of a mainscanning 600 dpi and a subscanning 600 dpi is once made to be expanded to 4 times the resolution in the subscanning direction. This method is carried out by simple padding of a repetition of data. Thus, after preparing the image of a mainscanning 600 dpi and a subscanning 2400 dpi, in a screen processing part 1702, a screen processing having 5 tones of 0 to 4 is applied to this image which has been converted into 4 times the resolution in the subscanning direction. That is, as a result of the screen processing, an image having the tone of values of 0 to 4 which has been expanded to 4 times the resolution in the subscanning direction is outputted.

After that, in an interpolation processing part 604, in a subscanning-position-displacing-sampling part 1703, a tone value for 4 dots is added in the subscanning direction, and it is converted into a new dot, and sampling is going to be carried out toward the size of ¼ in the subscanning direction, that is, the subscanning 600 dpi of the original resolution. That is, in the processing illustrated in FIG. 17, the screen processing is carried out in the state where resolution has been expanded, and processing which returns the image with the screen processing finished to the image of the original resolution is carried out. The interpolation processing part 604, in the case of carrying out sampling toward the original resolution, carries out the interpolation processing by displacing a position where the sampling is carried out in consideration of the deviation amount described in FIG. 7, and is going to output the PWM values of 0 to 16. Then, as described in Embodiment 1, by controlling the position for 4 dots which is added in the subscanning-position-displacing-sampling part 1703 so that the vertical inversion may occur with the change point as a border, the interpolation and the smoothing are realized. As for the output of the interpolation processing part, the raster image data of the mainscanning 600 dpi and the subscanning 600 dpi, having the PWM value of 0 to 16 per one pixel of each CMYK color is outputted. Because 5 bits are needed as the data length if outputted as it is, the value is thinned out and rounded off to the value of 0 to 15.

Here, 0 to 15 are outputted as it is, for example, and in the case of 16, that is, full pixel ON, it will be rounded off to 15.

Figure 18:
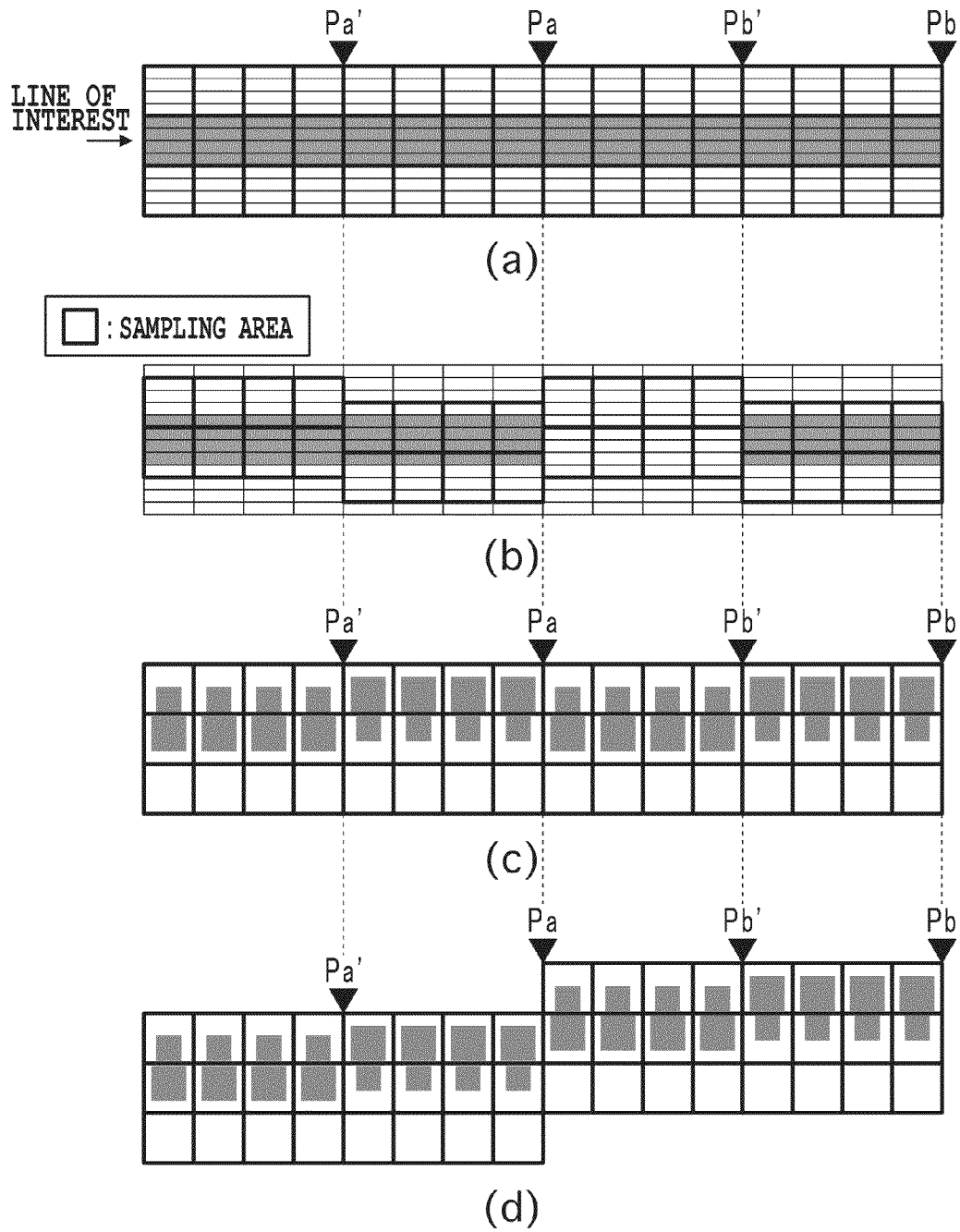
FIG. 18 is a figure illustrating schematically processing according to change of a pixel in Embodiment 2.

FIG. 18 shows a figure illustrating schematically processing according to the change of a pixel in Embodiment 2. (a) of FIG. 18 illustrates an aspect where an image expanded to 4 times the resolution in the subscanning direction is inputted. A region surrounded by a wide line in (a) of FIG. 18 corresponds to the region for one dot of the original resolution. (b) of FIG. 18 illustrates a phase in which the tone value for 4 dots is added and the sampling is carried out into the new one dot for an input as illustrated in (a) of FIG. 18. (b) of FIG. 18 illustrates an aspect where the phase is shifted with the change point Pa, Pb and Pa', Pb' located at the middle position thereof as a border. A conceptual diagram of an output acquired by sampling with the phase shifted like this becomes as illustrated in (c) of FIG. 18. In (b) FIG. 18, for the region of Pa' to Pa, a sampling for 4 dots is carried out at the position displaced by ¼ pixel in the preceding line direction. For the region of Pa to Pb', a sampling for 4 dots is carried out at the position displaced by ¼ pixel in the succeeding line direction. With respect to the sampling position (that is, shift of the phase) of a dot, it will be computed depending on the amount of the registration deviation (profile characteristic) as described in FIG. 7.

In the case of (c) of FIG. 18, an input of one dot is always expanded into 2 dots in the subscanning direction, and moreover, the vertical ratio is limited to 2 ways of 1:3 or 3:1, and the same result as the case described in Embodiment 1 has been acquired.

Therefore, it results that, as for the line of one dot which is illustrated in the figure, a dot having the exposure time of 4/16 and a dot having the exposure time of 12/16 are made to perform vertical inversion at the center point of the change points (Pa', Pb' in the figure). Therefore, between the two regions, only by the way of locating dots changing vertically, the density based on half dots becomes equivalent, and the level difference is smoothed into the line having 1-or-less dot.

Finally, as illustrated in (d) of FIG. 18, in the memory part 108, the change processing in one-pixel-basis is carried out at the time of outputting from the memory part 108. In the same way as above, since the change processing exceeding one pixel is carried out at the time of being read out from the memory part 108, it results that the large level difference before and after the change point Pa will disappear here.

Figure 19:
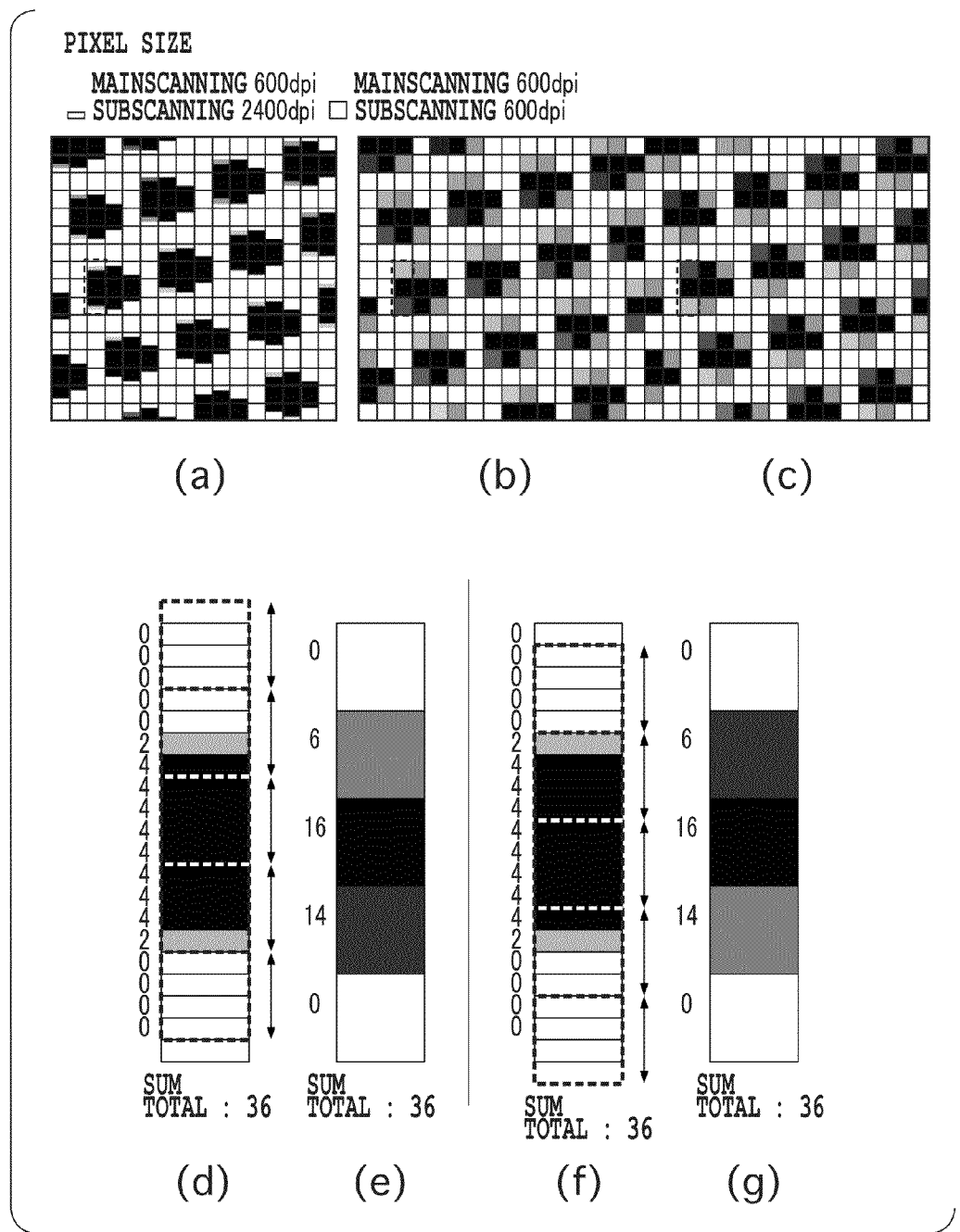
FIG. 19 is an example of the image data where the change is carried out for a screen image in Embodiment 2.

Next, not the line image of a full dot as illustrated in FIG. 18, but an example in the case of a halftone image being inputted after screen processing including a half dot will be described using FIG. 19. (a) of FIG. 19 illustrates an image of a mainscanning 600 dpi and an subscanning 2400 dpi, after a screen processing of 4 tones for each dot. Because, in this figure, the resolution differs by the mainscanning and the subscanning, and is coarse in the mainscanning, a pixel is expressed in a landscape shape. A square grid on this image becomes the grid of the subscanning 600 dpi. Against this image, an image which is sampled into the mainscanning 600 dpi and subscanning 600 dpi after displacing the centroid downward by ¼ pixel in terms of 600 dpi is (b). Similarly, an image in which the centroid is displaced upward by ¼ pixel and the sampling is carried out is (c).

In (d) of FIG. 19, as a sample which was taken out from a part of (a), illustrated is a dot sequence after the screen of 20 pixels in terms of 2400 dpi and 5 pixels in terms of 600 dpi in the subscanning direction at a certain main scanning position. As illustrated in this (d), the order of the screen is defined so that dots may be going to light up in a vertical symmetry. Thereby, after that, even if the centroid is displaced downward by ¼ pixel and the sampling is carried out like a dotted line of (d), the total value as a matter of course, the shape of the dot which only carries out vertical inversion, and also the way of locating half dots, becomes the same, like (e). It becomes possible to also minimize diffusion of dots. Similarly, even if the centroid is displaced upward by ¼ pixel and the sampling is carried out like a dotted line of (f), the total value as a matter of course, the shape of the dot which only carries out vertical inversion, and also the way of locating half dots, becomes the same, like (g). It becomes possible to also minimize diffusion of dots.

In this way, in the present embodiment, by the simple processing that the screen processing is carried out in a state where the resolution is expanded in the subscanning direction, and an image with the screen finished is returned to the original resolution in consideration of the deviation amount, it becomes possible to carry out the centroid movement less than one dot. In particular, also for an image after the screen processing including half dots, it becomes possible to carry out the centroid movement less than one dot as the way of locating the half dot maintains the relation of vertical inversion in the subscanning direction. Thereby, even when it is hard for the linearity to come out in the relation between the PWM tone and the density, it becomes possible to make the level difference into less than one dot without causing unevenness in density against the image after the screen.

Here, as a matter of convenience for the description, the PWM was described by 16 divisions as an example where it is hard for linearity of the density to come out, but it is not limited to this.

In the description in this time, an example in which the resolution was increased by 4 times only in the subscanning direction, and was made to be 2400 dpi-nized was described, and however, even by carrying out a screen processing of a 1-bit-binary after making it to be 2400 dpi including also the mainscanning, the same as above is possible. Although the resolution was also described using the input of 600 dpi, it is not limited to this.

<Embodiment 3>

In the above Embodiment 2, by increasing the resolution in the subscanning direction before the screen processing, in order that the unevenness in density or the thickness changes may not be caused by the interpolation processing, half dots which maintains the relation of vertical inversion has been given, the centroid movement less than one dot has been carried out, and the level difference has been smoothed.

In Embodiment 3, described is a configuration in which, without increasing the resolution before the screen processing, for a dot expressing the 4-bit halftone, the way of locating the half dot maintains the relation of the vertical inversion with the change point as a border, and the density equivalence is realized.

In the present embodiment, details are described with respect to the HT processing part illustrated in 107, and the description before and after the processing is the same as Embodiment 1, and therefore, is omitted.

Figure 20:
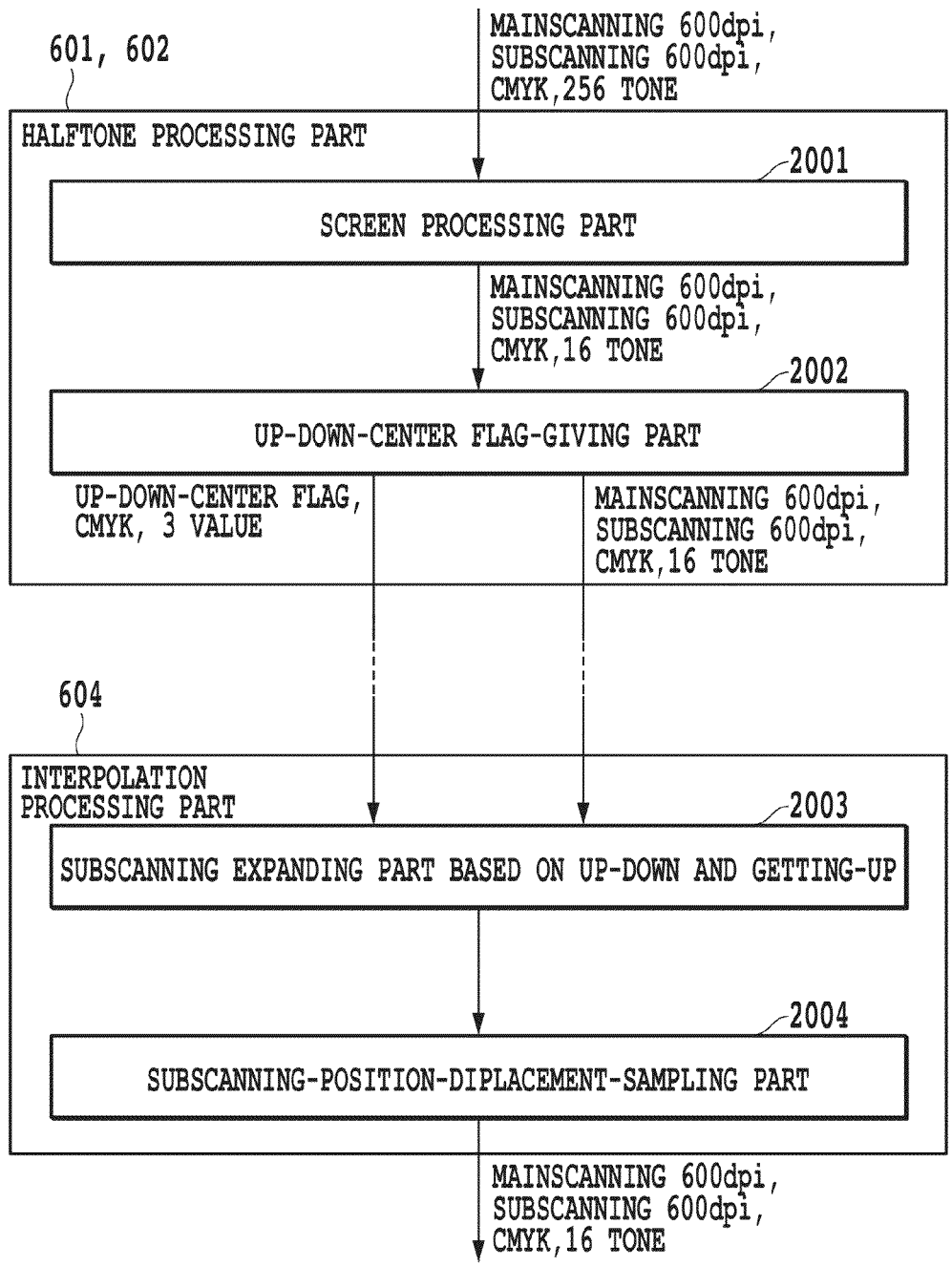
FIG. 20 is a block diagram illustrating a detailed configuration of the HT processing part in Embodiment 3.

Detailed explanation is carried out using FIG. 20. In a screen processing part 2001, for the inputted multi tone raster image data of each CMYK color of a mainscanning 600 dpi and a subscanning 600 dpi, a screen processing which has 16 tones of 0 to 15 is applied for the image. For the data, flag information of 3 values indicating a direction of up-down-center in which a dot gets up is given for each pixel in an up-down-center flag-giving part. This flag is defined, for example, as center for 0, down for 1 and up for 2. This flag defines the direction in which a dot gets up to the dot which begins to light up first as a dot of the screen.

Figure 21:
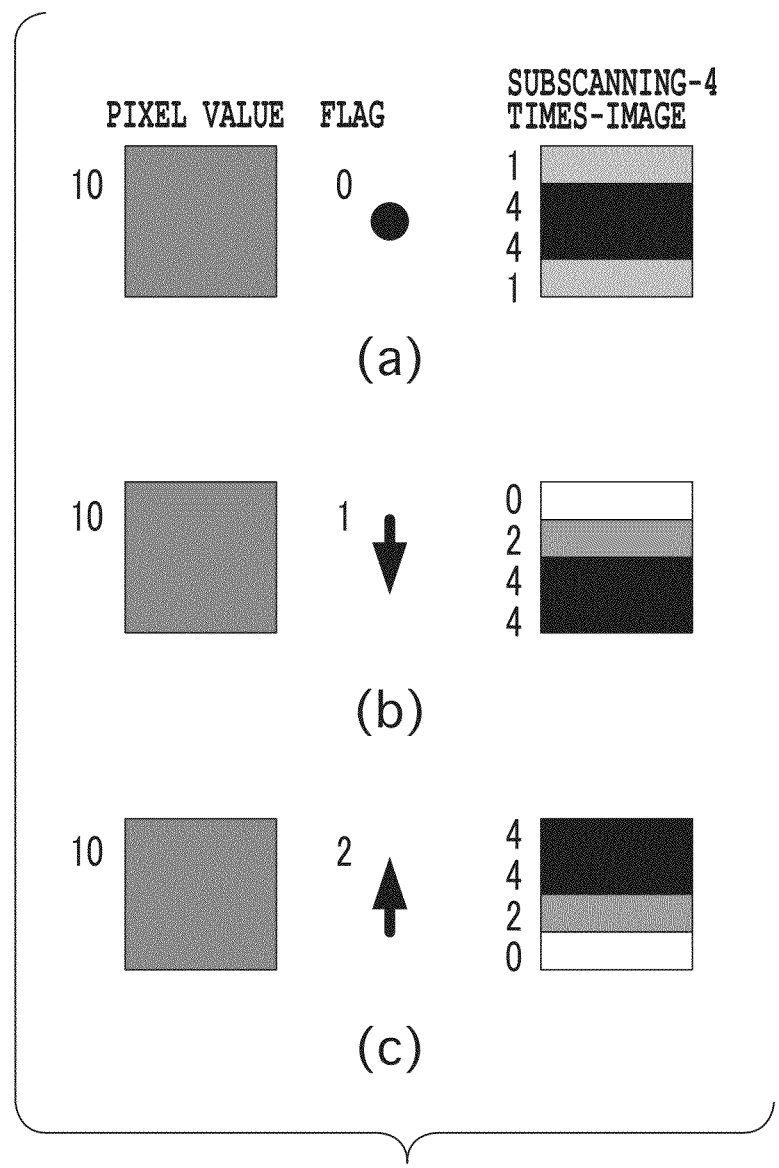
FIG. 21 is an example of an input/output of an up-down-center flag of a dot in Embodiment 3.

After that, in the interpolation processing part 604, in a subscanning expanding part 2003 based on up-down and getting-up, in consideration of getting-up-locating thereof based on 4-bit image data and 3-value flag information, 4-bit image data are expanded 4 times in the subscanning direction. The details are illustrated in FIG. 21. As illustrated in the figure, even in the case of the pixel value having the same value that is 10, the getting-up-locating of the data that is expanded depending on the flag information differs by the up-down-center. If it is (a), because a flag of 0 which means the center is given, as for 4 pixels of the output, 4 is outputted to 2 pixels in the center, and 1 is outputted to the up side and down side thereof. If it is (b), because a flag of 1 which means the down side is given, each of 2 pixels of the down side becomes 4, and the up side pixel thereof becomes 2, and the top becomes 0, and in the case of a flag of 2 which means the up side being given as illustrated in (c), it becomes a reverse case thereof.

After that, as described also in Embodiment 2, the tone value for 4 dots is added in the subscanning direction, and it is converted into a new dot, and sampling will be carried out toward the size of ¼ in the subscanning direction. As for a value outputted, as the PWM value of 0 to 16, the interpolation part is going to output it.

Figure 22:
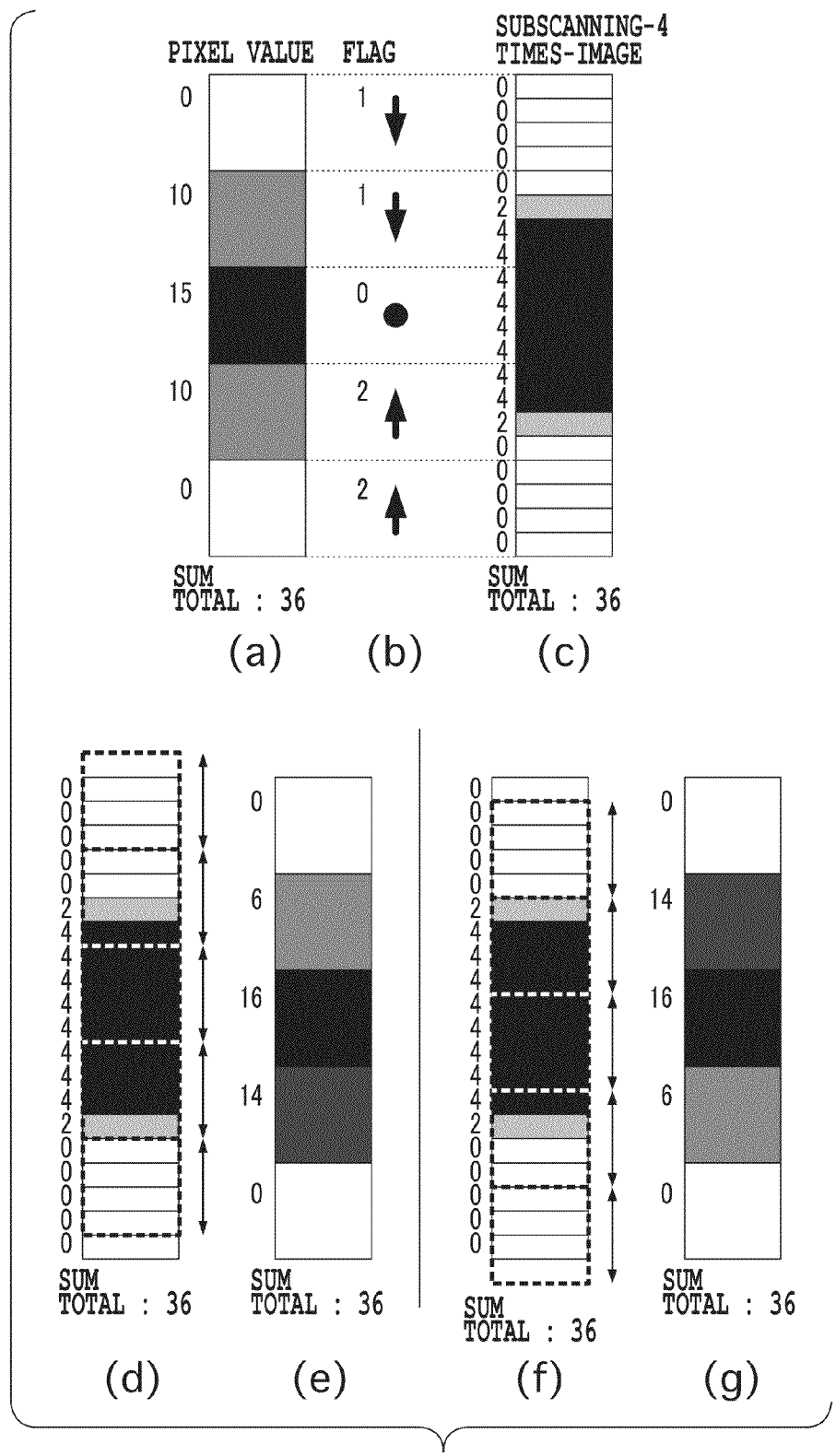
FIG. 22 is an example of an image data where the change is carried out against a screen image in Embodiment 3.

An illustrative example, with the FIG. 19 as an exemplar, is illustrated in FIG. 22. When an image after the screen of 600 dpi as illustrated in (a) of FIG. 22, and flags as illustrated in (b) by a flag giving part, are inputted into the subscanning expanding part 2003 based on up-down and getting-up, the output thereof becomes a shape where images get up toward the center as shown in (c).

Processing in the following is the same as that of Embodiment 2. As illustrated in this (a) of FIG. 22, the order of the screen is defined so that dots may be going to light up in a vertical symmetry, and flags are given as illustrated in (b). Thereby, after that, even if the sampling is carried out like (d) and (e), or even if the sampling is carried out like (f) and (g), the total value as a matter of course, the shape of the dot which only carries out vertical inversion, and also the way of locating half dots, become the same, and it becomes possible to also minimize diffusion of dots.

The flag indicating a direction in which a dot gets up is defined as a matrix together with the threshold value matrix of the screen, and is set in the up-down-center flag-giving part. The matrix is realizable by defining a dot which lights up first in isolation in the subscanning direction so as to be located at the center, and defining a dot which lights up after that is so as to get up to the dot which has been lighted up already. This order of lighting up can be easily prepared from the threshold value matrix of the screen.

Thereby, it becomes possible to make the output of the halftone processing part be the image of a 4-bit 600 dpi and the flag data of 2 bits of resolution thereof, and against the data of 2400 dpi in the above Embodiment 2, an equivalent effect can be realized by small data.

<Other Embodiments>

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-260320, filed Nov. 13, 2009, which is hereby incorporated by reference herein in its entirety.

What is claimed is:

1. An image forming apparatus comprising:
an interpolation processing component configured to carry out less-than-one-pixel-basis correction of image data by correcting density of each pixel of the image data so that, with respect to a change point that defines a location where one-pixel-basis correction is carried out for the image data, a sequence of pulse width according to the density of the pixel in a subscanning direction comes into an inverted relationship before and after the change point , wherein a sequence pattern of pulse width having the inverted relationship is limited to a two-sequence pattern; and
an image forming component configured to form an image based on a signal acquired by carrying out a pulse width modulation according to the corrected density of the image data.

2. The image forming apparatus according to claim 1 further comprising a half toning component configured to convert inputted image data of M-value into the image data of N-value (M>N) using a dither method, and output the converted image data to the interpolation processing component.

3. The image forming apparatus according to claim 2 wherein the half toning component uses the dither method in which order of lighting of dots lights up in a vertical symmetry in the subscanning direction.

4. The image forming apparatus according to claim 2,
wherein the half toning component converts inputted image data of M-value into the image data having high resolution at least in the subscanning direction, and converts the converted image data into the image data of N-value using the dither method, and
the interpolation processing component carries out the less-than-one-pixel-basis correction by carrying out conversion into the image data having lower resolution than the high resolution by shifting a phase.

5. The image forming apparatus according to claim 3,
wherein the half toning component converts inputted image data of M-value into the image data having high resolution at least in the subscanning direction, and converts the converted image data into the image data of N-value using the dither method, and the interpolation processing component carries out the less-than-one-pixel-basis correction by carrying out conversion into the image data having lower resolution than the high resolution by shifting a phase.

6. The image forming apparatus according to claim 2, wherein the half toning component further outputs a flag indicating a deviation amount related to the image data in the subscanning direction to the interpolation processing component, and the interpolation processing component carries out the less-than-one-pixel-basis correction by converting the image data based on the flag.

7. The image forming apparatus according to claim 3, wherein the half toning component further outputs a flag indicating a deviation amount related to the image data in the subscanning direction to the interpolation processing component, and the interpolation processing component carries out the less-than-one-pixel-basis correction by converting the image data based on the flag.

8. An image forming method, comprising the steps of:

carrying out interpolation processing of less-than-one-pixel-basis correction of image data by correcting density of each pixel of the image data so that, with respect to a change point that defines a location where one-pixel-basis correction is carried out for the image data, a sequence of pulse width according to the density of the pixel in a subscanning direction comes into inverted relationship before and after the change point, wherein a sequence pattern of pulse width having the inverted relationship is limited to a two-sequence pattern; and carrying out image formation of forming an image based on a signal acquired by carrying out a pulse width modulation according to the corrected density of the image data.

9. A non-transitory computer-readable recording medium with a program making a computer execute an image forming method recorded therein, the image forming method comprising the steps of:

carrying out interpolation processing of less-than-one-pixel-basis correction of image data by correcting density of each pixel of the image data so that, with respect to a change point that defines a location where one-pixel-basis correction is carried out for the image data, a sequence of pulse width according to the density of the pixel in a subscanning direction comes into inverted relationship before and after the change point, wherein a sequence pattern of pulse width having the inverted relationship is limited to a two-sequence pattern; and carrying out image formation of forming an image based on a signal acquired by carrying out a pulse width modulation according to the corrected density of the image data.

* * * * *